(12) United States Patent
Ikeda et al.

(10) Patent No.: US 8,631,465 B2
(45) Date of Patent: Jan. 14, 2014

(54) TERMINAL OF AN ENVIRONMENT MANAGEMENT STATION AND A SERVICE USER PROVIDED A SERVICE, METHOD FOR PROCESSING AN EVALUATION VALUE OF A TERMINAL, A SERVICE REQUEST AND A SERVICE PROVIDING

(75) Inventors: Keiichi Ikeda, Kawasaki (JP); Seigo Kotani, Kawasaki (JP); Masato Suzuki, Kawasaki (JP); Akihiro Inomata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1261 days.

(21) Appl. No.: 11/892,941

(22) Filed: Aug. 28, 2007

(65) Prior Publication Data

US 2008/0066156 A1 Mar. 13, 2008

Related U.S. Application Data

(63) Continuation of application No. PCT/JP2005/016346, filed on Sep. 6, 2005, and a continuation of application No. PCT/JP2005/003271, filed on Feb. 28, 2005.

(51) Int. Cl.
*H04L 29/06* (2006.01)

(52) U.S. Cl.
USPC ........... 726/3; 726/2; 726/26; 726/27; 726/28

(58) Field of Classification Search
USPC ....................... 726/2, 3, 26, 27, 28
See application file for complete search history.

(56) References Cited

U.S. PATENT DOCUMENTS

| | | | |
|---|---|---|---|
| 5,544,321 A | | 8/1996 | Theimer et al. |
| 5,557,748 A | * | 9/1996 | Norris ........................... 709/220 |
| 5,842,199 A | * | 11/1998 | Miller et al. ........................... 1/1 |
| 5,940,373 A | * | 8/1999 | Chiu et al. ..................... 370/238 |
| 6,141,682 A | * | 10/2000 | Barker ........................... 709/217 |
| 6,292,659 B1 | * | 9/2001 | Olds et al. ..................... 455/427 |
| 6,516,350 B1 | * | 2/2003 | Lumelsky et al. ............. 709/226 |

(Continued)

FOREIGN PATENT DOCUMENTS

| | | |
|---|---|---|
| EP | 0 961 490 | 12/1999 |
| JP | 9-62590 | 3/1997 |

(Continued)

OTHER PUBLICATIONS

International Search Report issued in International Application No. PCT/JP2005/016346 (mailed Oct. 11, 2005).

(Continued)

*Primary Examiner* — Bradley Holder
(74) *Attorney, Agent, or Firm* — Staas & Halsey LLP

(57) ABSTRACT

A terminal of an environment management station that calculates an evaluation value of a user terminal security, the evaluation value being used to determine whether to provide a service from a service provider to the user terminal, the terminal of the environment management station set in a third-party organization and stores environment information about to identify software or hardware that can be incorporated in the user terminal or hardware that can be connected to the user terminal, and the evaluation value of the user terminal in association with each other; a receiving unit that receives the environment information of the user terminal; an evaluation value calculating unit that calculates the evaluation value of the user terminal based on the evaluation value; and a transmitting unit that transmits the evaluation value to the terminal of the service provider.

6 Claims, 21 Drawing Sheets

(56) References Cited

U.S. PATENT DOCUMENTS

2001/0047406 A1* 11/2001 Araujo et al. ............... 709/223
2002/0010855 A1* 1/2002 Reshef et al. ............... 713/164
2002/0156731 A1* 10/2002 Seki et al. .................. 705/40
2004/0139316 A1 7/2004 Kotani
2006/0020525 A1* 1/2006 Borelli et al. ............... 705/34

FOREIGN PATENT DOCUMENTS

| JP | 11-149448 | 6/1999 |
| JP | 2000-13779 | 1/2000 |
| JP | 2001-117809 | 4/2001 |
| JP | 2002-032273 | 1/2002 |
| JP | 2002-197016 | 7/2002 |
| JP | 2004-157790 | 6/2004 |
| JP | 2004-361996 | 12/2004 |

OTHER PUBLICATIONS

Written Opinion of International Application No. PCT/JP2005/016346 (dated Oct. 11, 2005).
Japanese Office Action for corresponding Japanese Application 2007-505796; dated Jun. 22, 2010.
European Office Action for corresponding European Application 05782228.0-1244; dated Nov. 10, 2011.

* cited by examiner

FIG.4

EVALUATION DB
15a

| ENVIRONMENT INFORMATION OF VENDOR PRODUCT (VENDOR NAME, PRODUCT NAME, VERSION, ETC.) | HASHED ENVIRONMENT INFORMATION | EVALUATION VALUE | | |
|---|---|---|---|---|
| | | SECURITY | PERFOR-MANCE | ... |
| COMPANY A, OS-A, VERSION 2002,··· | (HASH VALUE OF ENVIRONMENT INFORMATION) | 90 | 70 | ... |
| COMPANY A, OS-A, VERSION 2000,··· | (HASH VALUE OF ENVIRONMENT INFORMATION) | 80 | 70 | ... |
| COMPANY B, CPU-B, VERSION 95,··· | (HASH VALUE OF ENVIRONMENT INFORMATION) | 80 | 90 | ... |
| COMPANY C, MEMORY C, VERSION 5,··· | (HASH VALUE OF ENVIRONMENT INFORMATION) | 80 | 60 | ... |
| . . . | . . . | . . . | . . . | . . . |

FIG.5

SERVICE DB
25a

| SERVICE ID | SERVICE NAME (MOVING-IMAGE CONTENT NAME) | CONTENT DATA |
|---|---|---|
| S0001 | ○○○ | (DATA FOR 56 k) (DATA FOR 200 k) |
| S0002 | △△△ | (DATA FOR 200 k) |
| S0003 | × × × | (DATA FOR 56 k) (DATA FOR 200 k) |
| . . . | . . . | . . . |

FIG.6

SERVICE POLICY DB
25b

| SERVICE ID | SERVICE PROVISION CONDITION | ENVIRONMENT INFORMATION OBTAINING INSTRUCTION ID |
|---|---|---|
| S0001 | SECURITY: 90 OR HIGHER PERFORMANCE: 80 OR HIGHER | INSTRUCTION ID 1 (OBTAIN ENVIRONMENT INFORMATION OF OS) |
| S0002 | SECURITY: 80 OR HIGHER | INSTRUCTION ID 2 (OBTAIN ENVIRONMENT INFORMATION OF OS AND CPU) |
| S0003 | SECURITY: 70 OR HIGHER PERFORMANCE: 80 OR HIGHER | INSTRUCTION ID 3 (OBTAIN ENVIRONMENT INFORMATION OF CPU) |
| . | . | . |
| . | . | . |
| . | . | . |

FIG.7

USER DB
25c

| USER ID | USER NAME | SERVICE HISTORY ||||
|---|---|---|---|---|---|
| | | DATE AND TIME | SERVICE ID | EVALUATION VALUE | CONTROL DETAIL |
| U0001 | ○○○○ | 050301 / 2200 | S0001 | SECURITY: 90 PERFORMANCE: 90 | TRANSMIT DATA FOR 200 k |
| U0002 | △△△△ | 050301 / 2300 | S0002 | SECURITY: 70 PERFORMANCE: 90 | REJECT DATA TRANSMISSION |
| . | . | . | . | . | . |
| . | . | . | . | . | . |
| . | . | . | . | . | . |

FIG.8

ENVIRONMENT INFORMATION
OBTAINING INSTRUCTION DB
35a

| SERVICE ID | ENVIRONMENT INFORMATION OBTAINING INSTRUCTION ID |
|---|---|
| S0001 | INSTRUCTION ID 1 (OBTAIN ENVIRONMENT INFORMATION OF OS) |
| S0002 | INSTRUCTION ID 2 (OBTAIN ENVIRONMENT INFORMATION OF OS AND CPU) |
| S0003 | INSTRUCTION ID 3 (OBTAIN ENVIRONMENT INFORMATION OF CPU) |
| ⋮ | ⋮ |

FIG.9

SERVICE REQUEST TABLE
35b

| SERVICE REQUEST ID | SERVICE ID | USER ID | HASHED ENVIRONMENT INFORMATION | EVALUATION VALUE |
|---|---|---|---|---|
| R0001 | S0001 | U0001 | (HASH VALUE OF ENVIRONMENT INFORMATION) | SECURITY: 90 PERFORMANCE: 90 |
| R0002 | S0002 | U0002 | (HASH VALUE OF ENVIRONMENT INFORMATION) | SECURITY: 70 PERFORMANCE: 90 |
| ⋮ | ⋮ | ⋮ | ⋮ | ⋮ |

ENVIRONMENT INFORMATION TABLE 45a

| ENVIRONMENT INFORMATION ABOUT USER TERMINAL |
|---|
| COMPANY A, OS-A, VERSION 2002,··· |
| ··· |
| COMPANY B, CPU-B, VERSION 95,··· |
| COMPANY C, MEMORY C, VERSION 5,··· |
| ··· |
| COMPANY D, BIOS-D, VERSION 1.5,··· |
| . |
| . |
| . |

FIG.19

INITIAL ENVIRONMENT INFORMATION DB
55a

| TERMINAL ID | INITIAL ENVIRONMENT INFORMATION ABOUT TERMINAL |
|---|---|
| A1100 | COMPANY A, OS-A, VERSION 2002,··· |
| | ··· |
| | COMPANY B, CPU-B, VERSION 98,··· |
| | COMPANY C, MEMORY C, VERSION 5,··· |
| | ··· |
| | COMPANY D, BIOS-D, VERSION 1.5,··· |
| | ··· |
| ⋮ | ⋮ |

FIG.20

| DEVICE VENDOR ID | TERMINAL ID | INITIAL ENVIRONMENT INFORMATION ABOUT TERMINAL | HASHED INITIAL ENVIRONMENT INFORMATION |
|---|---|---|---|
| 08712 | A1100 | COMPANY A, OS-A, VERSION 2002,··· | (HASH VALUE OF ENVIRONMENT INFORMATION) |
| | | ··· | ··· |
| | | COMPANY B, CPU-B, VERSION 95,··· | (HASH VALUE OF ENVIRONMENT INFORMATION) |
| | | COMPANY C, MEMORY C, VERSION 5,··· | (HASH VALUE OF ENVIRONMENT INFORMATION) |
| | | ··· | ··· |
| | | COMPANY D, BIOS-D, VERSION 1.5,··· | (HASH VALUE OF ENVIRONMENT INFORMATION) |
| | | ··· | ··· |
| ··· | ··· | | |

DEVICE REGISTRATION INFORMATION DB
65a

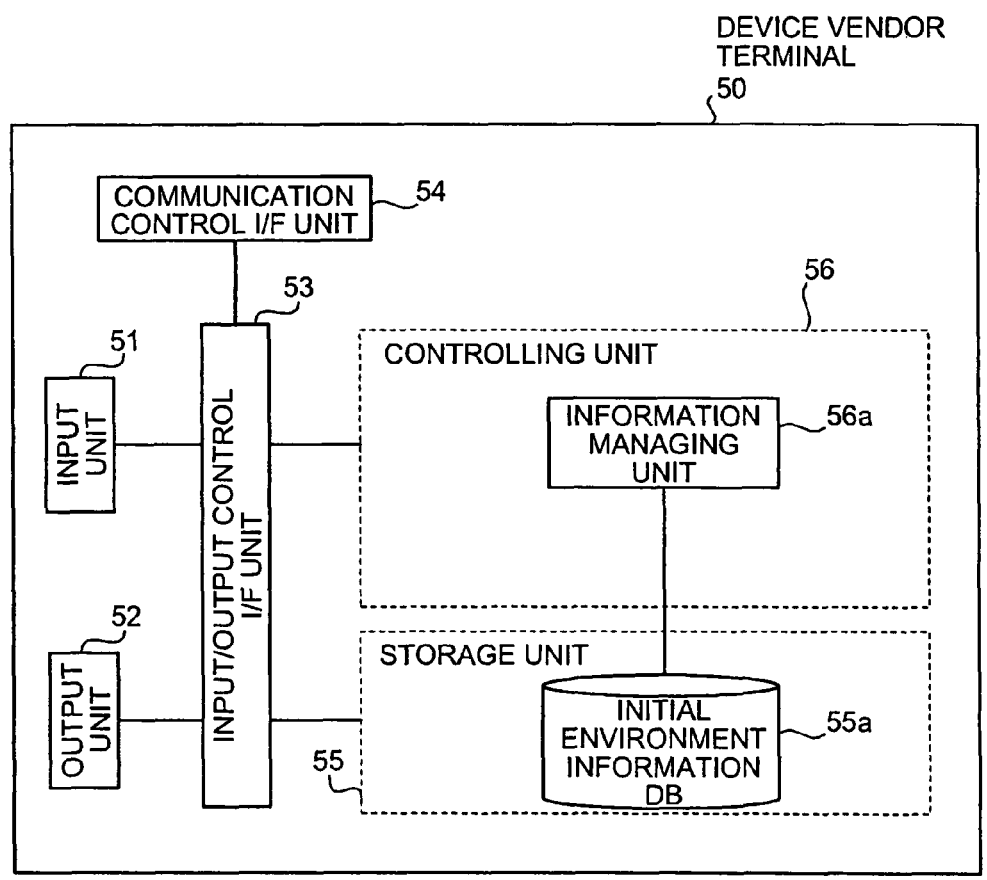

TERMINAL OF AN ENVIRONMENT MANAGEMENT STATION AND A SERVICE USER PROVIDED A SERVICE, METHOD FOR PROCESSING AN EVALUATION VALUE OF A TERMINAL, A SERVICE REQUEST AND A SERVICE PROVIDING

CROSS REFERENCE TO RELATED APPLICATIONS

This is a continuing application, filed under 35 U.S.C. §111(a), of PCT/JP2005/003271, filed Feb. 28, 2005, and PCT/JP2005/16346, filed Sep. 6, 2005, the contents of which are incorporated herein by reference.

BACKGROUND OF THE INVENTION

1. Field of the Invention

The present invention relates to a service controlling system, service controlling method, and a computer product that control a service provided from a service provider terminal to a user terminal through a network.

2. Description of the Related Art

Conventionally, when a service is provided from a service provider terminal to a user terminal through a network, for the purpose of ensuring security of the service, the service is provided after the environment of the user terminal is checked. For example, Patent Document 1 (Japanese Patent Application Laid-Open No. 2004-157790) discloses a technology in which the service provider terminal first obtains, from the user terminal, environment information regarding the user terminal, such as information about software (Operating System (OS), Basic Input Output System (BIOS), browser, plug-in software, and others) and hardware (Central Processing Unit (CPU), memory, Peripheral Component Interconnect (PCI) board, and others) incorporated in the user terminal and information about hardware connected to the user terminal, and it is then checked whether software or hardware that would impair security of the user terminal (for example, the one that does not care about a security hole) is incorporated in the user terminal, whether hardware that would impair security is connected to the user terminal, and the like. For a terminal that cannot ensure security in fear of unauthorized copy or the like, service provision is rejected.

Here, in the conventional technology explained above, the service is controlled by the service provider obtaining the environment information regarding the user terminal, thereby posing a problem in which such service control would invite resistance from users whose environment information regarding their own terminals is not desired to be grasped by the service provider.

SUMMARY OF THE INVENTION

It is an object of the present invention to at least partially solve the problems in the conventional technology.

According to an aspect of the present invention, a terminal of an environment management station that calculates an evaluation value of a terminal of a service user in view of security, the evaluation value being used to determine whether to provide a service from a terminal of a service provider to the terminal of the service user through a terminal of a network provider, wherein the terminal of the environment management station is set in a third-party organization other than the service provider, the service user or the network provider, the terminal of the environment management station including an evaluation value storing unit that stores environment information to identify software or hardware that can be incorporated in the terminal of the service user or hardware that can be connected to the terminal of the service user, and the evaluation value of the terminal of the service user in view of security in association with each other; a receiving unit that receives the environment information of the terminal of the service user from the terminal of the service user through the terminal of the network provider; an evaluation value calculating unit that calculates the evaluation value of the terminal of the service user based on the evaluation value storing unit; and a transmitting unit that transmits the evaluation value calculated by the evaluation value calculating unit to the terminal of the service provider through the terminal of the network provider.

According to another aspect of the present invention, a method for processing an evaluation value of a terminal of a service user in view of security, the evaluation value being used to determine whether to provide a service from a terminal of a service provider to the terminal of the service user through a terminal of a network provider from a terminal of an environment management station set in a third-party organization other than the service provider, the service user or the network provider, the method including receiving environment information of the terminal of the service user through the terminal of the network provider, the environment information identifying software or hardware that can be incorporated in the terminal of the service user or hardware that can be connected to the terminal of the service user; calculating the evaluation value of the terminal of the service user based on the evaluation value storing unit that stores the environment information and the evaluation value of the terminal of the service user in view of security in association with each other; and transmitting the evaluation value to the terminal of the service provider through the terminal of the network provider.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a drawing of an example of information stored in an evaluation database (DB);

FIG. 5 is a drawing of an example of information stored in a service DB;

FIG. 6 is a drawing of an example of information stored in a service policy DB;

FIG. 7 is a drawing of an example of information stored in a user DB;

FIG. 8 is a drawing of an example of information stored in an environment information obtaining instruction DB;

FIG. 9 is a drawing of an example of information stored in a service request table;

FIG. 19 is a drawing of an example of information stored in an initial environment information DB;

FIG. 20 is a drawing of an example of information stored in a device registration information DB;

FIG. 21 is a drawing of an example of information stored in an evaluation value correction amount DB;

FIG. 22 is a block diagram of the configuration of a device vendor terminal;

DETAILED DESCRIPTION OF THE PREFERRED EMBODIMENTS

Exemplary embodiments of the present invention are explained in detail below with reference to the accompanying drawings. Here, in the following, a case is first explained as a first embodiment where the present invention is applied to a service that provides contents from a service provider terminal to a user terminal, and then another case is explained as a second embodiment.

In the first embodiment below, sequentially explained are general outlines and features of a service controlling system according to the first embodiment, a process before service control, a process at the time of service control, a configuration of each device, a procedure at the time of service control, and effects and others of the first embodiment.

Figure 1:
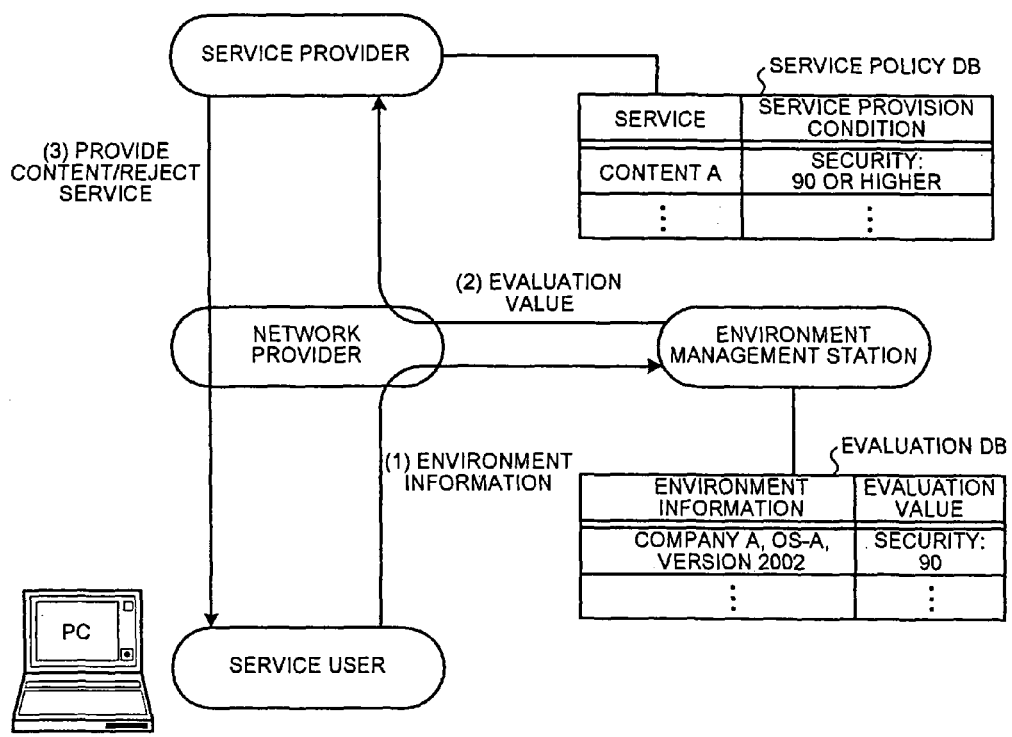
FIG. 1 is a drawing for explaining general outlines and features of a first embodiment.

First, by using FIG. 1, the general outlines and features of the service controlling system according to the first embodiment are explained. FIG. 1 is a drawing for explaining general outlines and features of the first embodiment.

The outlines of this service controlling system are such that a service provided from a service provider terminal to a service user terminal through a network is controlled. Specifically, the service that provides a content, such as movie or music, from a service provider terminal to a service user terminal through a network is controlled according to the environment of the service user terminal in a manner such that a service user terminal incorporated therein software (for example, the one that does not care for a security hole) or hardware that impairs security and a service user terminal having connected thereto hardware that impairs security are rejected for content provision.

Also, this service controlling system has a main feature in which a service is controlled without the service provider obtaining environment information regarding the user terminal, such as information about software (OS, BIOS, browser, plug-in software, and others) and hardware (CPU, memory, PCI board, and others) incorporated in the user terminal and information about hardware and others connected to the user terminal. The service controlling system considers resistance from users whose environment information regarding their own terminals is not desired to be grasped by the service provider.

This main feature is now briefly explained. As depicted in FIG. 1, in the service controlling system according to the first embodiment, a network provider (for example, an Internet Service Provider (ISP) operator and the like) involved between the service provider and the service user and also an environment management station, which is a third-party organization other than the network provider, controls a service in collaboration with the service provider.

Among these, upon obtaining, from a device vendor or others, information about software and hardware that can be incorporated in the service user terminal, the environment management station adds evaluation values in view of security and performance based on vulnerability and capability of the hardware and software to manage these evaluation values and the environment information in association with each other. That is, for example, a terminal of the environment management station manages an evaluation database (DB) in which the environment information and the evaluation values are associated with each other in a manner such that "OS-A (version 2002) of A company=security evaluation value of 90 and performance evaluation value of 70; OS-A (version 2000) of A company=security evaluation value of 90 and performance evaluation value of 70; . . . ".

On the other hand, the service provider manages evaluation values required for providing each content as service provision conditions in association with the service (content). That is, for example, a terminal of the service provider manages a service policy DB in which each service and its service provision condition are associated with each other in a manner such that "provision condition of content A=security evaluation value of 90 or higher and performance evaluation value of 90 or higher; provision condition of content B=security evaluation value of 70 or higher and performance evaluation value of 90 or higher".

Now, when the service user is to be provided with a service from a service provider, environment information of the service user terminal is transmitted to an environment management station terminal through the network provider (refer to (1) of FIG. 1). The environment management station terminal then calculates evaluation values corresponding to the received environment information based on the evaluation DB, and the calculated evaluation values are transmitted to the service provider terminal through the network provider (refer to (2) of the same drawing). The service provider terminal then determines based on the service policy DB whether the received evaluation values satisfy a service provision condition, thereby performing service control of providing a content or rejecting the service (refer to (3) of the same drawing).

In this manner, in the service controlling system according to the first embodiment, the environment management station away from the service provider evaluates the environment of the service user terminal and calculates evaluation values, and the service is controlled based on these evaluation values. Therefore, for example, a content can be provided only to the terminal not having low evaluation values (for example, an invulnerable terminal, a terminal not with a low performance, etc.). As explained in the main feature above, the service can be controlled without the service provider obtaining the environment information regarding the service user terminal.

Here, the service controlling system according to the first embodiment has other features including: not only calculating an evaluation value in view of security (vulnerability) but also calculating an evaluation value in view of performance; calculating these evaluation values at the terminal of the environment management station, which is a third-party organization other than the network provider; accepting a service request and requesting calculation of evaluation values by the network provider as an agent; accepting, by the network provider, service identification information as a service request instead of a service detail; transmitting, by the network provider, service request identification information instead of user identification information to request evaluation; and accepting, by the network provider, hashed environment information from the user terminal to request evaluation.

Figure 2:
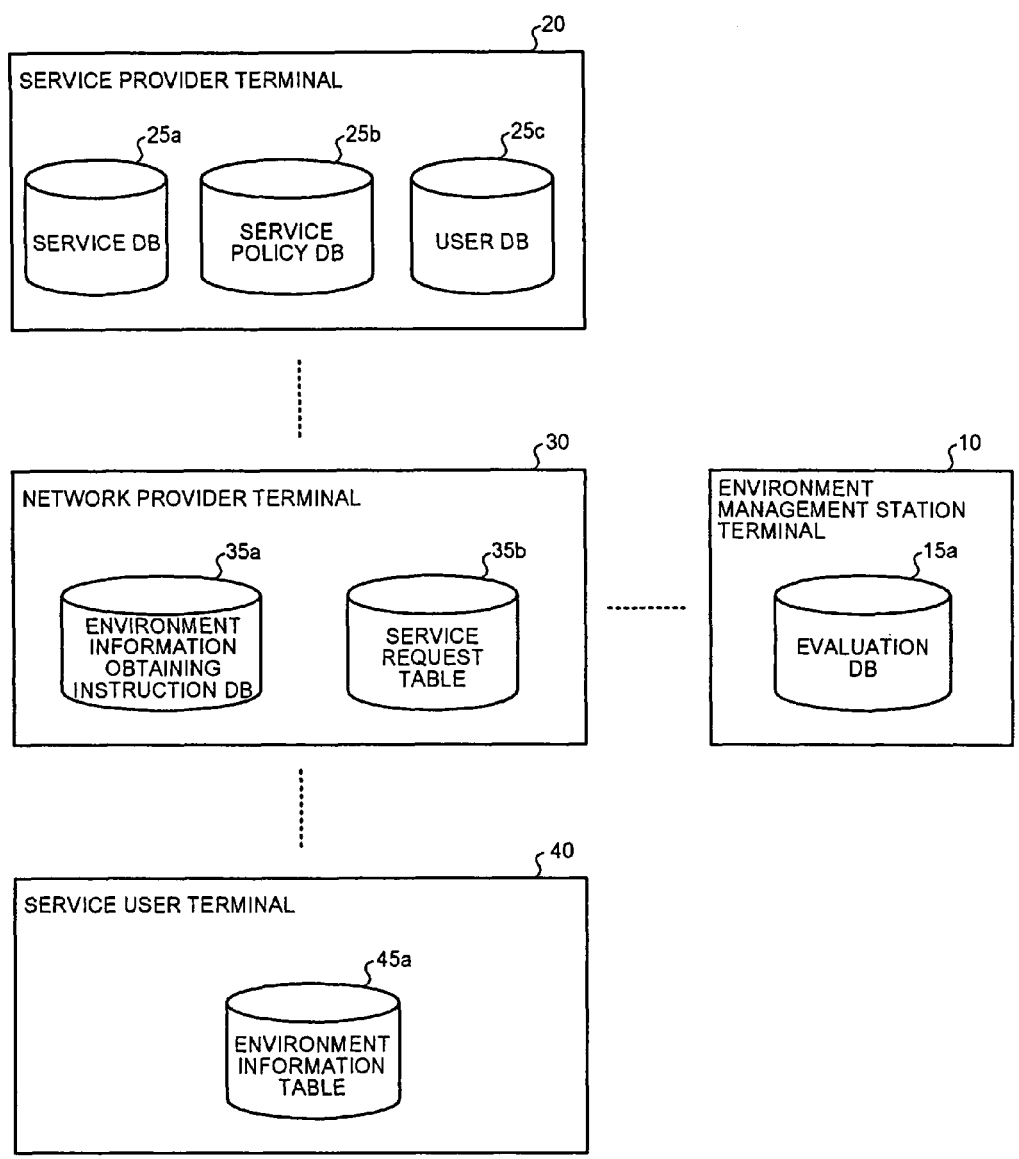
FIG. 2 is a drawing for explaining a process before service control.
Figures 10, 11:
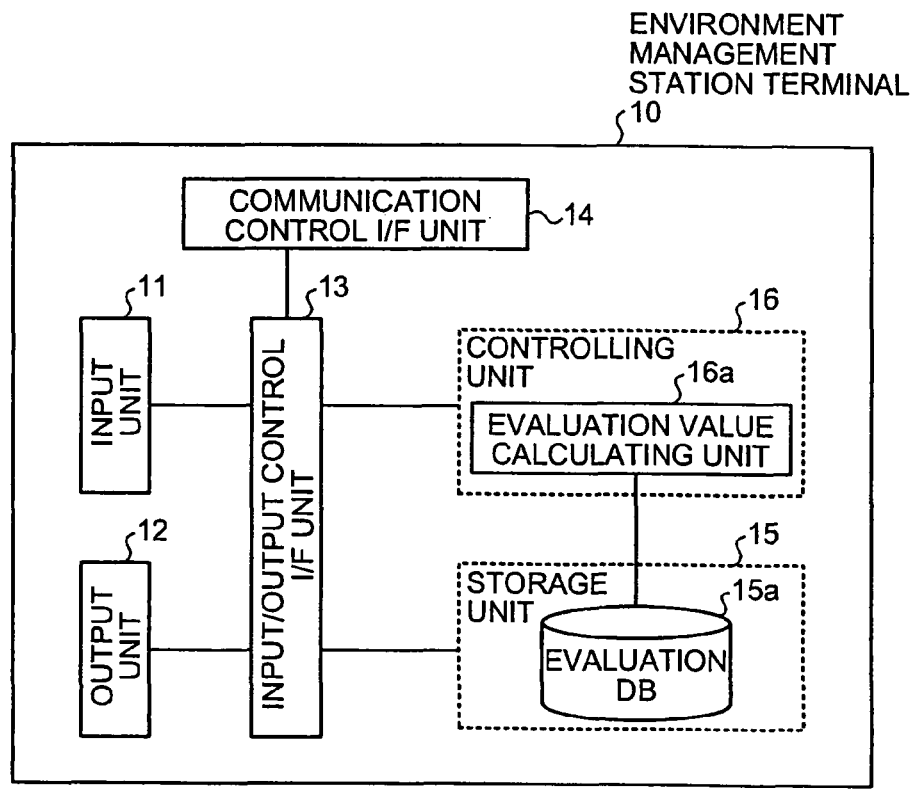
FIG. 10 is a drawing of an example of information stored in an environment information table.
FIG. 11 is a block diagram of the configuration of an environment management station terminal.

Next, by using FIGS. 2 and 4 to 10, a process before service control in the service controlling system according to the first embodiment is explained. FIG. 2 is a drawing for explaining the process before service control. FIG. 4 is a drawing of an example of information stored in an evaluation DB. FIG. 5 is a drawing of an example of information stored in a service DB. FIG. 6 is a drawing of an example of information stored in a service policy DB. FIG. 7 is a drawing of an example of information stored in a user DB. FIG. 8 is a drawing of an example of information stored in an environment information obtaining instruction DB. FIG. 9 is a drawing of an example of information stored in a service request table. FIG. 10 is a drawing of an example of information stored in an environment information table.

As depicted in FIG. 2, the service controlling system according to the first embodiment includes an environment management station terminal 10, a service provider terminal 20, a network provider terminal 30, and a service user terminal 40, which are communicably connected through a network (the Internet, a local-area network (LAN), a public telephone line, or others). As a process before service control, each of the terminals 10 to 40 generates various types of storage unit (databases and tables), as explained in the following.

The environment management station terminal 10 is a server computer owned by an environment management station, and includes, as depicted in FIG. 2, an evaluation DB 15a. Here, the evaluation DB 15a is a storage unit having stored therein evaluation values of vendor products that can be incorporated in the service user terminal 40 and specifically includes, as depicted in FIG. 4, environment information of each vendor product, hashed environment information, and evaluation values in association with each other.

Among these, "the environment information" and "the hashed environment information" are registered in the evaluation DB 15a every time information (environment information) about software and hardware that can be incorporated in the service user terminal 40 is obtained from the device vendor. Also, the "evaluation values" are determined in view of security and performance based on vulnerability and capability of the vendor product at the time of obtaining the vender product, and are registered in association with "the environment information" and "the hashed environment information". Furthermore, thus registered "evaluation values" are reviewed and updated for registration when new vulnerability (security hole) is found later or when a latecomer with higher performance is manufactured. Here, in the first embodiment, the "evaluation values" includes a "security evaluation value" determined in view of security based on vulnerability of the vendor product and a "performance evaluation value" determined in view of performance based on capability of the vendor product.

The service provider terminal 20 is a server computer owned by a service provider and includes, as depicted in FIG. 2, a service DB 25a, a service policy DB 25b, and a user DB 25c. Here, the service DB 25a is a storage unit having stored therein information about a service (for example, a content) provided by the service provider and specifically has stored therein, for each service (content), as depicted in FIG. 5, a service identifier (ID) for uniquely identifying each content, a service name (moving-image content name), and content data in association with each other. Here, the stored content data may include, as depicted in the same drawing, data with high image quality suitable for provision to a service user terminal 40 with high performance and data with low image quality suitable for provision to a service user terminal 40 with low performance.

The service policy DB 25b is a storage unit having stored therein a policy regarding service provision and specifically has stored therein, as depicted in FIG. 6, a service ID of each content (service), a service provision condition (evaluation value required for provision of each content), and an environment information obtaining instruction ID (instruction in which a type of environment information for use in evaluation is defined) in association with each other. Here, depending on the setting of "the evaluation value" as the service provision condition, service control can be achieved such that a content can be provided only to a terminal with its evaluation value being not so low (for example, an invulnerable terminal, a terminal not with a low performance, etc.). Here, the "environment information obtaining instruction ID" is defined for each service because a target for evaluation may vary for each service (for example, the target for evaluation may be only the security of the OS, only the performance of the CPU, the security and performance of the OS and the CPU, or others).

The user DB 25c is a storage unit having stored therein information about a service user and specifically has stored therein, for each service user, as depicted in FIG. 7, a user ID for uniquely identifying the service user, a user name, and service history (service control date and time, service ID, evaluation values used in evaluation, and service control execution results) in association with each other. Here, the "service history" is registered at the time of a service controlling process, which will be explained further below.

The network provider terminal 20 is a server computer owned by a network provider and includes, as depicted in FIG. 2, an environment information obtaining instruction DB 35a and a service request table 35b. Here, the environment information obtaining instruction DB 35a is a storage unit having stored therein information regarding the environment information obtaining instruction ID and specifically has stored therein, for each service (content) provided by the service provider, as depicted in FIG. 8, the service ID and the environment information obtaining instruction ID in association with each other. Here, as the service ID and environment information obtaining instruction ID, those provided online or offline from the service provider are registered.

The service request table 35b is a storage unit having stored therein information regarding a service request accepted from the service user terminal 40. For each service request, the service request table 35b has stored therein a service request ID for uniquely identifying each service request, a service ID included in the service request, a user ID included in the service request, hashed environment information accepted from the service user terminal 40, and evaluation values obtained from the environment management station terminal 10 in association with each other. Here, these service request ID, service ID, user ID, hashed environment information, and evaluation values are registered at the time of the service controlling process, which will be explained further below.

The service user terminal 40 is any one of a personal computer, a workstation, a home game machine, an Internet television (TV), a Personal Digital Assistance (PDA), a mobile communication terminal, such as a cellular phone or a Personal Handyphone System (PHS), other known devices owned by a service user and includes, as depicted in FIG. 2, an environment information table 45a.

Here, the environment information table 45a is a storage unit having stored therein information regarding the environment of the service user terminal 40 and specifically has stored therein, environment information, such as, as depicted in FIG. 10, software (OS, BIOS, browser, plug-in software, and others) incorporated in the service user terminal 40 hardware (CPU, memory PCI board, and others) and hardware connected to the service user terminal 40. Here, such environment information is collected by the service user terminal 40 itself at the time of starting the service user terminal 40 for registration in the environment information table 45a. Also when new software is installed after startup and when new hardware is connected after startup, the environment information mentioned above is collected by the service user terminal 40 itself for registration in the environment information table 45a.

Figure 3:
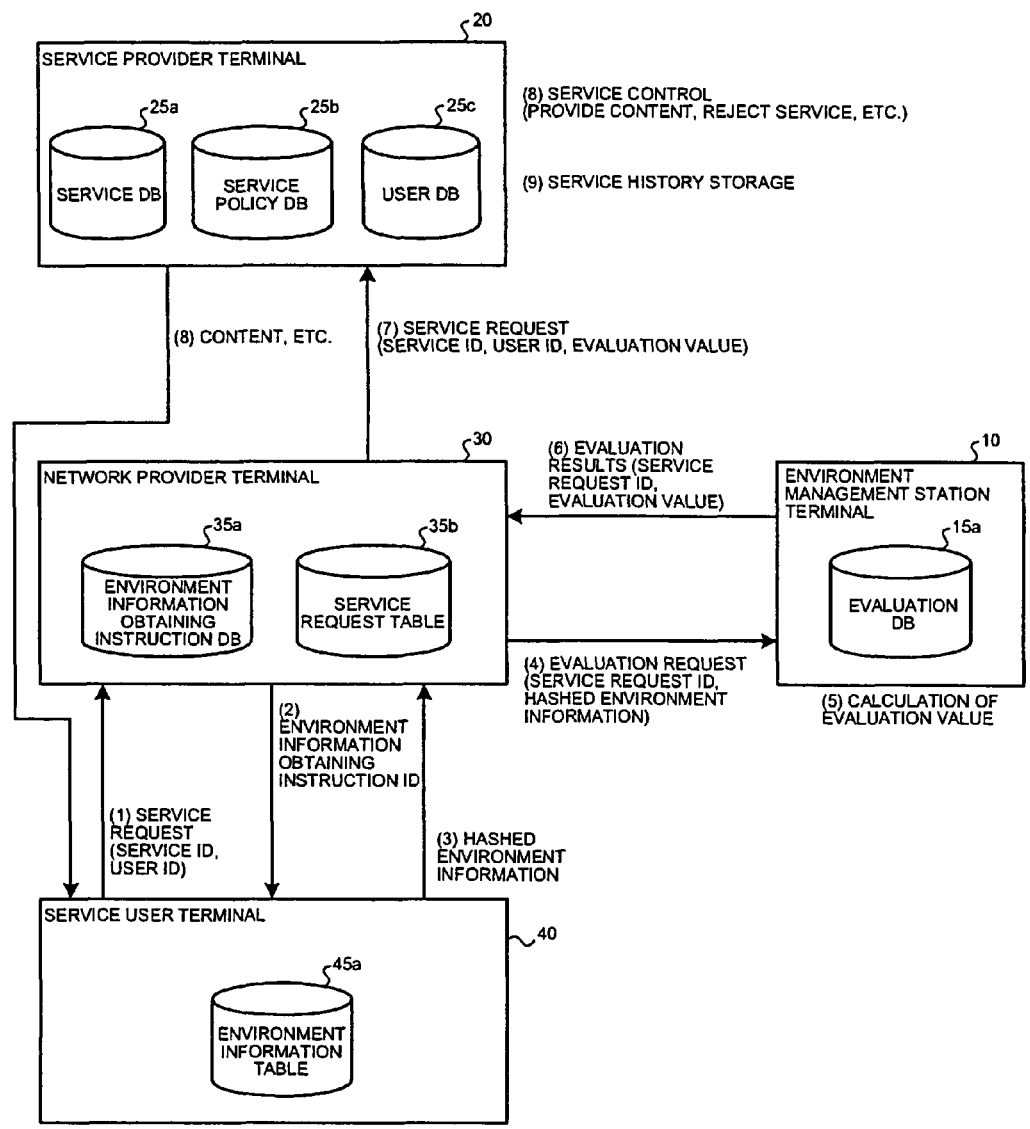
FIG. 3 is a drawing for explaining a process at the time of service control.

Next, further using FIG. 3, the process at the time of service control in the service controlling system according to the first embodiment is explained. FIG. 3 is a drawing for explaining the process at the time of service control.

As depicted in FIG. 3, when a service request message (for example, a Hypertext Transfer Protocol (HTTP) message) formed of a service ID and a user ID is transmitted from the service user terminal 40 to the network provider terminal 30, the network provider terminal 30 issues a service request ID, and registers "the service requesting ID, the service ID and the user ID" in association with each other in the service request table 35b (refer to (1) in FIG. 3). Here, the network provider terminal 30 accepts the service ID instead of a service detail (for example, the title of the content) as a service request from the service user terminal 40.

The network provider terminal 30 accepting such a service request then reads an environment information obtaining instruction ID corresponding to the service ID from the environment information obtaining instruction DB 35a, and transmits the environment information obtaining instruction ID to the service user terminal 40 (refer to (2) in FIG. 3). Then, the service user terminal 40 receiving such an environment information obtaining instruction ID reads environment information defined in this environment information obtaining instruction ID from the environment information table 45a, and then transmits hashed environment information obtained by hashing the environment information to the network provider terminal 30 (refer to (3) in FIG. 3). Here, not the environment information itself but the hashed environment information may be previously registered in the environment information table 45a. With this, the capacity of the environment information table 45a can be reduced.

The network provider terminal 30 then registers this hashed environment information in the service request table 35b, and also transmits this hashed environment information and its corresponding service request ID to the environment management station terminal 10 for requesting calculation of evaluation values (refer to (4) in FIG. 3). The environment management station terminal 10 receiving this request then calculates evaluation values by reading evaluation values corresponding to the hashed environment information included in the request from the evaluation DB 15a (refer to (5) in FIG. 3). Furthermore, the environment management station terminal 10 then transmits the evaluation results, formed of the calculated "evaluation values" and the "service request ID" included in the request, to the network provider terminal 30 (refer to (6) in FIG. 3).

Then, the network provider terminal 30 registers the received evaluation values from the environment management station terminal 10 in the service request table 35b, and also transmits a service request formed of the "service ID, user ID, and evaluation values" registered in the service request table 35b to the service provider terminal 20 (refer to (7) in FIG. 3). On the other hand, the service provider terminal 20 receiving the service request from the network provider terminal 30 refers to the service policy DB 25b to determine whether the evaluation values included in the service request satisfy the service provision condition of the service ID also included in the service request, and then controls the service to be provided to the service user terminal 40 (refer to (8) in FIG. 3).

That is, for example, to a service user terminal 40 satisfying the evaluation values of the service provision condition, the requested content is read from the service DB 25a for provision but, to a service user terminal 40 not satisfying the evaluation values of the service provision condition, content provision is rejected or, to a service user terminal 40 with only the performance evaluation value being low, content data with low image quality is read from the service DB 25a for provision. In this manner, service control is performed according to the service policy defined in the service policy DB 25b. Also, although the requested service is not allowed to be provided in this current situation, a case where the requested service is allowed to be provided can be presented to the user. Also, by presenting that "we can provide the requested service if you get an upgraded version of the OS", utilization is not rejected but can be promoted.

Furthermore, the service provider terminal 20 registers service history in the user DB 25c after service control (refer to (9) in FIG. 3). That is, in association with the user ID and user name of the service user issuing the service request, service history formed of the service control date and time, the service ID, the evaluation values for use in service control, and service control execution results is registered in the user DB 25c. With a series of processes explained above, the service can be controlled without the service provider obtaining the environment information regarding the service user terminal 40.

Next, by using FIG. 11, the configuration of the environment management station terminal 10 is explained. FIG. 11 is a block diagram of the configuration of the environment management station terminal 10. As depicted in the drawing, the environment management station terminal 10 includes an input unit 11, an output unit 12, an input/output control interface (I/F) unit 13, a communication control I/F unit 14, a storage unit 15, and a controlling unit 16.

Among these, the input unit 11 is a means for inputting various types of information and is configured of a keyboard, a mouse, or a microphone. For example, the input unit 11 accepts, from an operator of the environment management station, various types of information stored in the evaluation DB 15a for input. Here, a monitor (output unit 12), which will be explained below, also achieves a pointing device function in conjunction with the mouse.

The output unit 12 is an output unit that outputs various types of information and is configured of a monitor (or a display or a touch panel) or a loudspeaker. For example, the output unit 12 outputs various types of information stored in the evaluation DB 15a. The input/output control I/F unit 13 is a means for controlling inputs and outputs of data by these input unit 11 and the output unit 12, whilst the communication control I/F unit 14 is a means for controlling communication mainly with the network provider terminal 30.

The storage unit 15 is a means (holding means) for storing therein data and programs required for various processes by the controlling unit 16. In particular, the storage unit 15 closely related to the present invention includes the evaluation DB 15a, as depicted in FIG. 11. Here, this evaluation DB 15a is a means for storing therein evaluation values of vendor products that can be incorporated in the service user terminal 40, as explained above (refer to FIG. 4).

The controlling unit 16 is a means with an internal memory for storing therein programs and control data defining various types of procedures and performing these various processes with the programs and control data. In particular, the controlling unit 16 closely related to the present invention includes an evaluation value calculating unit 16a, as depicted in FIG. 11.

Here, the evaluation value calculating unit 16a is a processing unit that evaluates the environment regarding the service user terminal 40 and calculates evaluation values. Specifically, when an evaluation request formed of hashed environment information and a service request ID is received from the network provider terminal 30, the evaluation values corresponding to the hashed environment information included in the request are read from the evaluation DB 15a to calculate the evaluation values.

Figure 12:
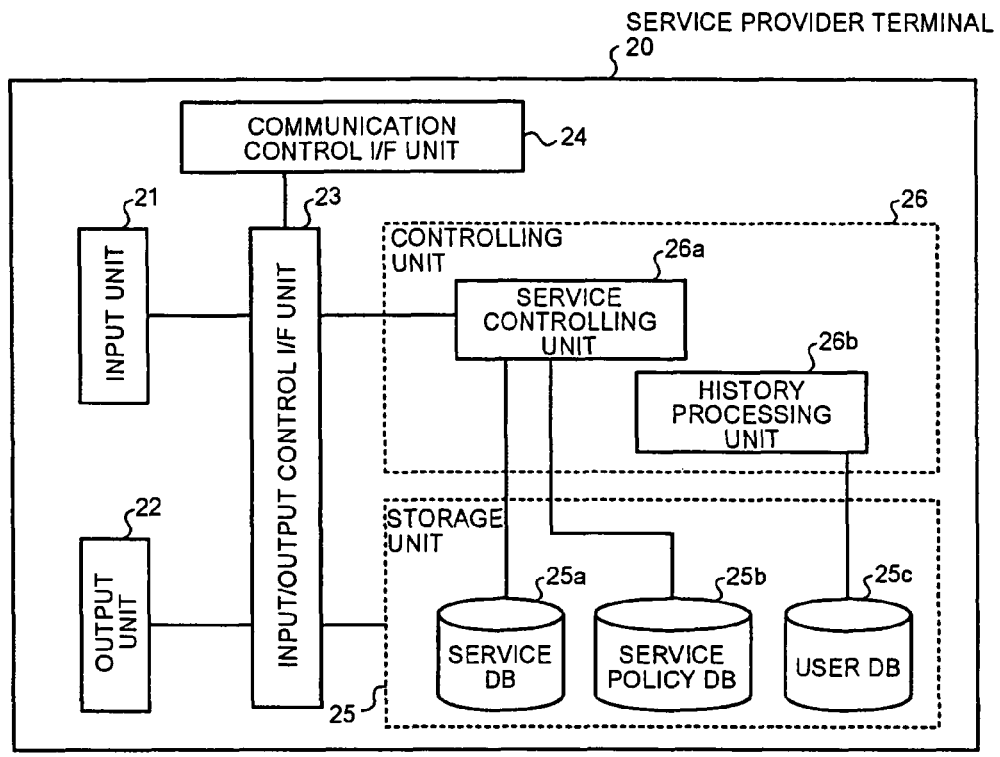
FIG. 12 is a block diagram of the configuration of a service provider terminal.

Next, by using FIG. 12, the configuration of the service provider terminal 20 is explained. FIG. 12 is a block diagram of the configuration of the service provider terminal 20. As depicted in the same drawing, the service provider terminal 20 includes an input unit 21, an output unit 22, an input/output control I/F unit 23, a communication control I/F unit 24, a storage unit 25, and a controlling unit 26.

Among these, the input unit 21 is a means for inputting various types of information and is configured of a keyboard, a mouse, or a microphone. For example, the input unit 21 accepts, from the service provider, various types of information stored in the service DB 25a and the service policy DB 25b for input. Here, a monitor (output unit 22), which will be explained below, also achieves a pointing device function in conjunction with the mouse.

The output unit 22 is a means for outputting various types of information and is configured of a monitor (or a display or a touch panel) or a loudspeaker. For example, the output unit 22 outputs various types of information stored in the service DB 25a, the service policy DB 25b, and the user DB 25c. The input/output control I/F unit 13 is a means for controlling inputs and outputs of data by these input unit 21 and the output unit 22, whilst the communication control I/F unit 24 is a means for controlling communication mainly with the network provider terminal 30.

The storage unit 25 is a means (holding means) for storing therein data and programs required for various processes by the controlling unit 26. In particular, the storage unit 25 closely related to the present invention includes the service DB 25a, the service policy DB 25b, and the user DB 25c, as depicted in FIG. 12. Here, as explained above, the service DB 25a is a means for storing therein information of services to be provided by the service provider (refer to FIG. 5), the service policy DB 25b is a means for storing therein a policy regarding service provision (refer to FIG. 6), and the user DB 25c is a means for storing therein information about the service user (refer to FIG. 7).

The controlling unit 26 is a means with an internal memory for storing therein programs and control data defining various types of procedures and performing these various processes with the programs and control data. In particular, the controlling unit 26 closely related to the present invention includes a service controlling unit 26a and a history processing unit 26b, as depicted in FIG. 12.

Here, the service controlling unit 26a is a processing unit that controls a service to be provided to the service user terminal 40 based on the evaluation values calculated at the environment management station terminal 10. Specifically, when a service request formed of a service ID, a user ID, and evaluation values is accepted from the network provider terminal 30, the service policy DB 25b is referred to determine whether the evaluation values included in the service request satisfy the service provision condition of the service ID also included in the service request, thereby controlling the service to be provided to the service user terminal 40.

The history processing unit 26b is a processing unit that processes history of the service to the user. Specifically, after execution of service control at the service controlling unit 26a, in association with the user ID and user name of the service user that has issued the service request, service history formed of a service control date and time, service ID, evaluation values for use in service control, and service control execution results is registered in the user DB 25c.

Figure 13:
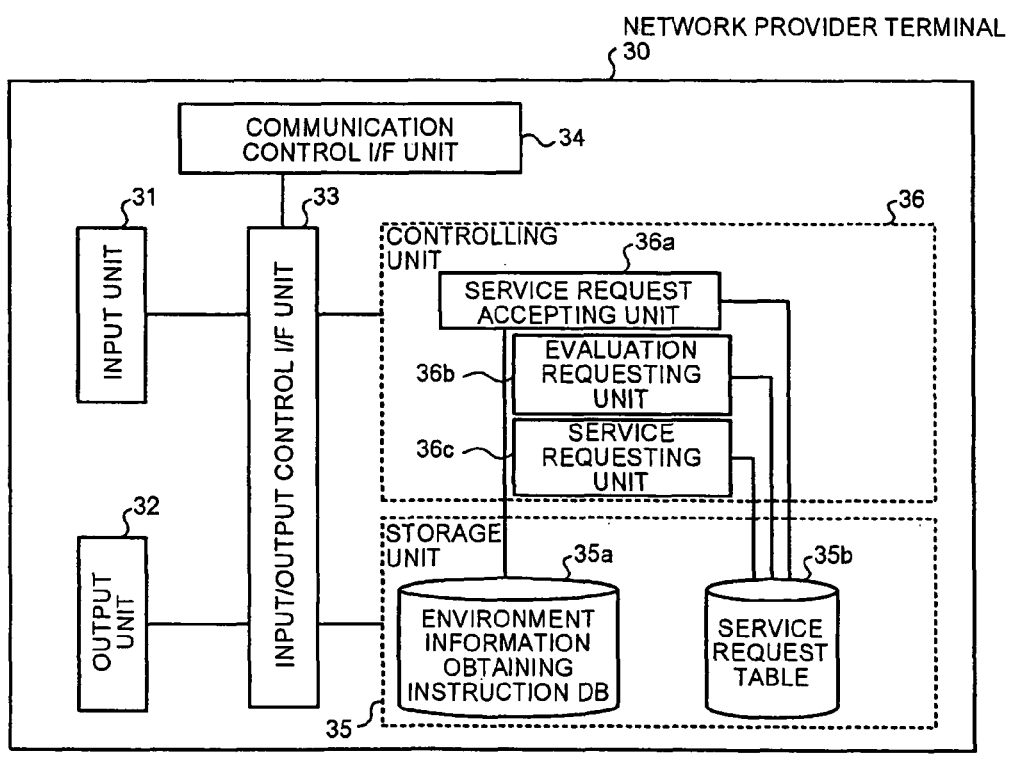
FIG. 13 is a block diagram of the configuration of a network provider terminal.

Next, by using FIG. 13, the configuration of the network provider terminal 30 is explained. FIG. 13 is a block diagram of the configuration of the network provider terminal 30. As depicted in the same drawing, the network provider terminal 30 includes an input unit 31, an output unit 32, an input/output control I/F unit 33, a communication control I/F unit 34, a storage unit 35, and a controlling unit 36.

Among these, the input unit 31 is a means for inputting various types of information and is configured of a keyboard, a mouse, or a microphone. For example, the input unit 31 accepts, from the network provider, various types of information stored in the environment information obtaining instruction DB 35a for input. Here, a monitor (output unit 32), which will be explained below, also achieves a pointing device function in conjunction with the mouse.

The output unit 32 is a means for outputting various types of information and is configured of a monitor (or a display or a touch panel) or a loudspeaker. For example, the output unit 32 outputs various types of information stored in the environment information obtaining instruction DB 35a and the service request table 35b. The input/output control I/F unit 33 is a means for controlling inputs and outputs of data by these input unit 31 and the output unit 32, whilst the communication control I/F unit 34 is a means for controlling communication mainly with the environment management station terminal 40, the service provider terminal 20 and the service user terminal 40.

The storage unit 35 is a means (holding means) for storing therein data and programs required for various processes by the controlling unit 36. In particular, the storage unit 35 closely related to the present invention includes the environment information obtaining instruction DB 35a and the service request table 35b, as depicted in FIG. 13. Here, as explained above, the environment information obtaining instruction DB 35a is a means for storing therein information regarding the environment information obtaining instruction ID (refer to FIG. 8), whilst the service request table 35b is a means for storing therein information regarding the service request accepted from the service user terminal 40 (refer to FIG. 9).

The controlling unit 36 is a means with an internal memory for storing therein programs and control data defining various types of procedures and performing these various processes with the programs and control data. In particular, the controlling unit 36 closely related to the present invention includes a service request accepting unit 36a, an evaluation requesting unit 36b, and a service requesting unit 36c, as depicted in FIG. 13.

Here, the service request accepting unit 36a is a processing unit that accepts a service request with respect to the service provider terminal 20 from the service user terminal 40. Specifically, a service request message (for example, an HTTP message) formed of the service ID of the service to be requested and the user ID of the service user is accepted from the service user terminal 40. Also, after the service request message is accepted, a service request ID is issued and registered in the service request table 35b in association with the service request ID, the service ID, and the user ID.

The evaluation requesting unit 36b is a processing unit that accepts the environment information about the service user terminal 40 from the service user terminal 40 and transmitting the environment information to the environment management station terminal 10 for requesting calculation of evaluation values. Specifically, an environment information obtaining instruction ID corresponding to the service ID included in the service request is read from the environment information obtaining instruction DB 35a for transmission to the service user terminal 40. Also, in response, when the hashed environment information is received from the service user terminal 40, the hashed environment information is registered in the service request table 35b, and also the hashed environment information and its corresponding service request ID are transmitted to the environment management station terminal 10 for requesting calculation of evaluation values.

The service requesting unit 36c is a processing unit that receives the evaluation values from the environment management station terminal 10 and then transmits the evaluation values and the service request to the service provider terminal 20. Specifically, when the evaluation values and the service request ID are received from the environment management station terminal 10 according to the request for calculation of evaluation values, the evaluation values are registered in the service request table 35b in association with the service request ID. Also, the service request formed of "the service ID, the user ID, and the evaluation values" registered in the service request table 35b is transmitted to the service provider terminal 20.

Figure 14:
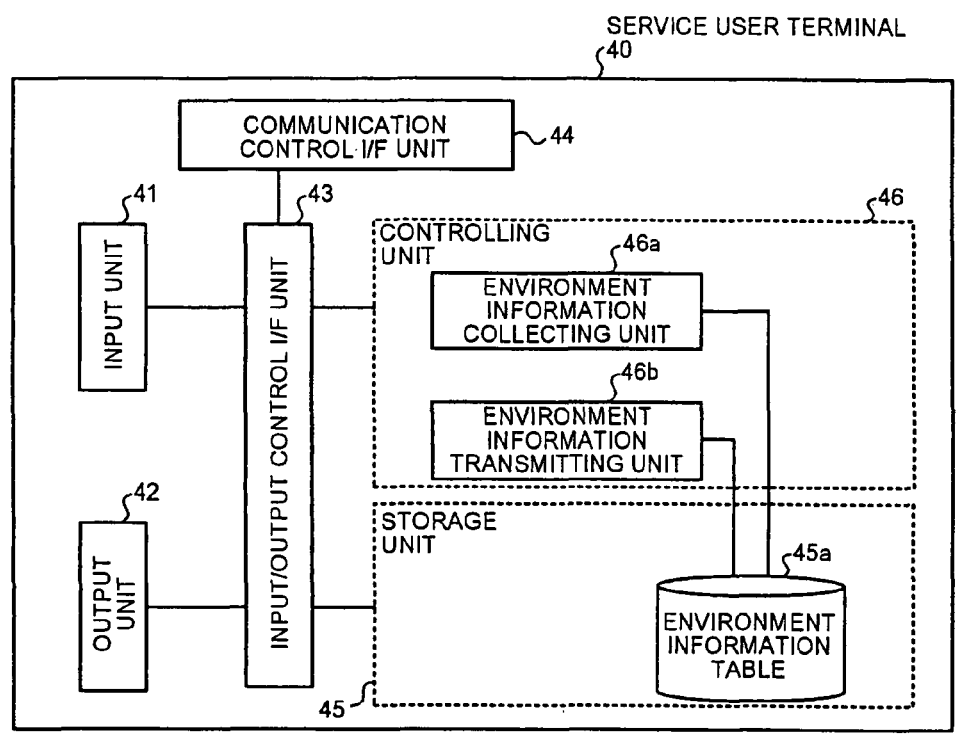
FIG. 14 is a block diagram of the configuration of a service user terminal.

Next, by using FIG. 14, the configuration of the service user terminal 40 is explained. FIG. 14 is a block diagram of the configuration of a service user terminal 40. As depicted in the same drawing, the service user terminal 40 includes an input unit 41, an output unit 42, an input/output control I/F unit 43, a communication control I/F unit 44, a storage unit 45, and a controlling unit 46.

Among these, the input unit 41 is a means for inputting various types of information and is configured of a keyboard, a mouse, or a microphone. For example, the input unit 41 accepts, from the service user, a service request message formed of the service ID and the user ID for input. Here, a monitor (output unit 42), which will be explained below, also achieves a pointing device function in conjunction with the mouse.

The output unit 42 is a means for outputting various types of information and is configured of a monitor (or a display or a touch panel) or a loudspeaker. For example, the output unit 42 outputs a content provided from the service provider terminal 20. The input/output control I/F unit 43 is a means for controlling inputs and outputs of data by these input unit 41 and the output unit 42, whilst the communication control I/F unit 44 is a means for controlling communication mainly with the network provider terminal 30.

The storage unit 45 is a means (holding means) or storing therein data and programs required for various processes by the controlling unit 46. In particular, the storage unit 45 closely related to the present invention includes the environment information table 45a, as depicted in FIG. 14. Here, as explained above, the environment information table 45a is a means for storing therein information regarding the environment of the service user terminal 40 (refer to FIG. 10).

The controlling unit 46 is a means with an internal memory for storing therein programs and control data defining various types of procedures and performing various processes with the programs and control data. In particular, the controlling unit 46 closely related to the present invention includes an environment information collecting unit 46a and an environment information transmitting unit 46b, as depicted in FIG. 14.

Here, the environment information collecting unit 46a is a processing unit of collecting the environment information of the service user terminal 40. Specifically, when the service user terminal 40 is started, the environment information collecting unit 46a collects its own environment information for registration in the environment information table 45a and, also when new software is installed after startup and when new hardware is connected after startup, collects by itself the environment information mentioned above for registration in the environment information table 45a.

The environment information transmitting unit 46b is a processing unit that transmits, at the time of requesting a service, the environment information to the network provider terminal 30. Specifically, upon receiving the environment information obtaining instruction ID from the network provider terminal 30 according to the transmission of the service request formed of the service ID and the user ID, the environment information transmitting unit 46b reads environment information defined in this environment information obtaining instruction ID from the environment information table 45a, and then transmits hashed environment information obtained by hashing the environment information to the network provider terminal 30.

Figure 15:
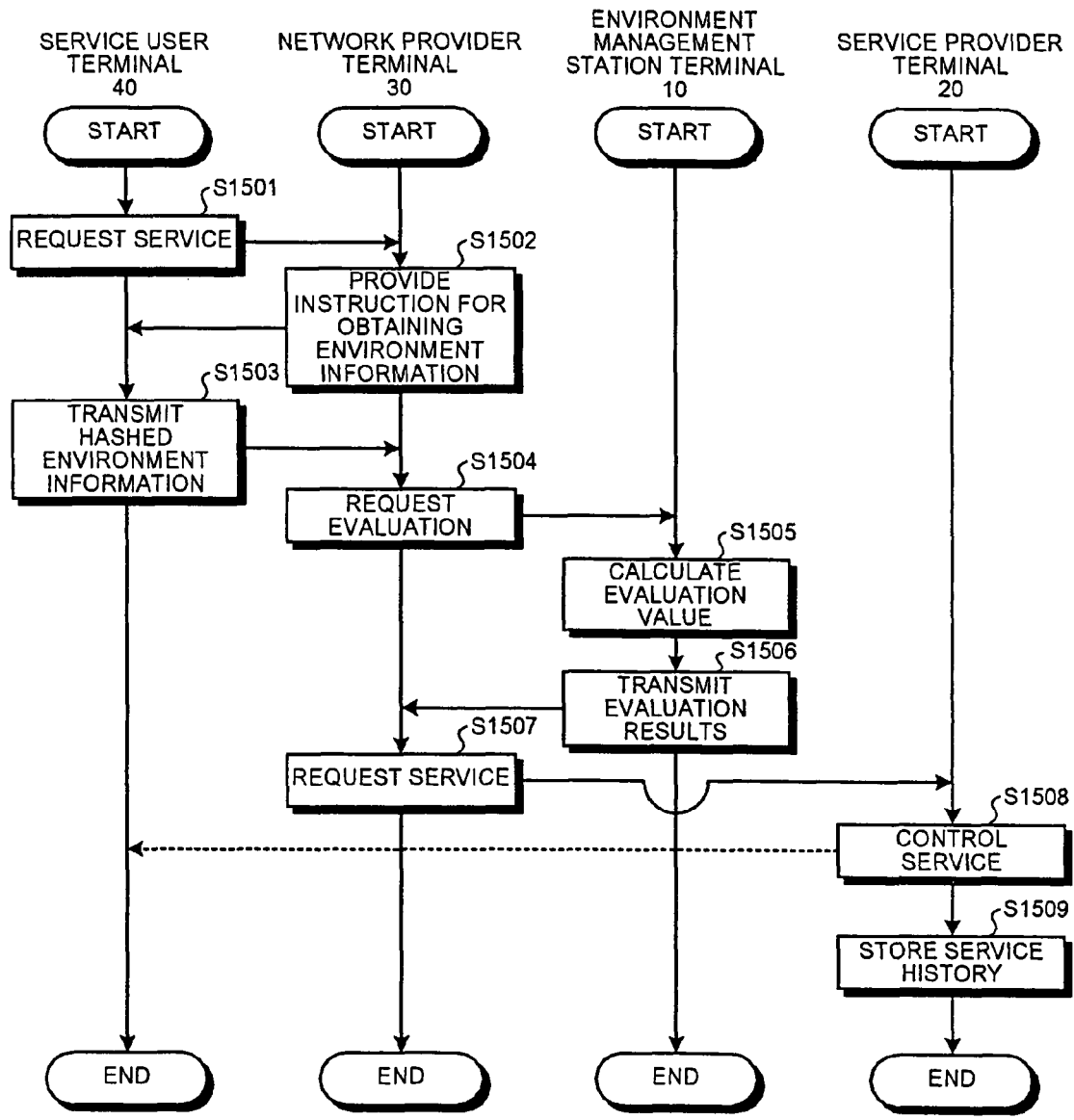
FIG. 15 is a flowchart of a process at the time of service control.

Next, by using FIG. 15, a procedure at the time of service control by the service controlling system according to the first embodiment is explained. FIG. 15 is a flowchart of the process at the time of service control. Here, in the following, it is assumed for explanation that each of the terminals 10 to 40 already has various types of means for storing as mentioned above (databases and tables).

As depicted in the drawing, when a service request message formed of the service ID and the user ID is transmitted from the service user terminal 40 to the network provider terminal 30 (step S1501), the network provider terminal 30 issues a service request ID to associate the service request ID, the service ID, and the user ID with each other for registration in the service request table 35b, and also reads the environment information obtaining instruction ID corresponding to the service ID from the environment information obtaining instruction DB for transmission to the service user terminal 40 (step S1502).

On the other hand, the service user terminal 40 receiving such an environment information obtaining instruction ID reads the environment information defined in this environment information obtaining instruction ID from the environment information table 45a, and transmits hashed environment information obtained by hashing the environment information to the network provider terminal 30 (step S1503). Then, the network provider terminal 30 registers the hashed environment information in the service request table 35b, and also transmits the hashed environment information and its corresponding service request ID to the environment management station terminal 10 for requesting calculation of evaluation values (step S1504).

Then, the environment management station terminal 10 receiving such an evaluation request reads evaluation values corresponding to the hashed environment information included in the request from the evaluation DB 15a, thereby calculating the evaluation values (step S1505). Furthermore, the environment management station terminal 10 transmits evaluation results formed of the evaluation values and the service request ID to the network provider terminal 30 (step S1506). Then, the network provider terminal 30 registers the evaluation values received from the environment management station terminal 10 in the service request table 35b, and also transmits a service request formed of the "service ID, user ID, and evaluation values" registered in the service request table 35b to the service provider terminal 20 (step S1507).

Then, the service provider terminal 20 receiving the service request from the network provider terminal 30 refers to the service policy DB 25b to determine whether the evaluation values included in the service request satisfy the service provision condition of the service ID also included in the service request, thereby controlling the service to be provided to the service user terminal 40 (step S1508). That is, for example, service control is performed according to the service policy defined in the service policy DB 25b in a manner such that the requested content is read from the service DB 25a and is provided only to the service user terminal 40 satisfying the evaluation values of the service provision condition.

Furthermore, after service control is performed, in association with the user ID and the user name of the service user issuing the service request, the service provider terminal 20 registers, in the user DB 25c, service history formed of the service control date and time, the service ID, the evaluation values for use in service control, and service control execution results (step S1509).

As explained above, according to the first embodiment above, the environment regarding the service user terminal 40 is evaluated at a place away from the service provider and, based on the evaluation values, the service provided from the service provider terminal 20 to the service user terminal 40 is controlled. For example, a service can be provided only to the service user terminal not having low evaluation scores (for example, an invulnerable terminal, a terminal not with a low performance, etc). Thus, the service can be controlled without the service provider obtaining the environment information regarding the service user terminal 40.

Also, according to the first embodiment, the environment regarding the service user terminal 40 is evaluated from a plurality of viewpoints to calculate evaluation values for the viewpoints and, based on the evaluation values at each viewpoint, the service is controlled. Therefore, for example, the evaluation values can be calculated not only in view of security (vulnerability) but also in view of performance. Furthermore, various service control can be achieved according to the characteristic of the service in a manner such that the service is controlled based on any one or a plurality of these evaluation values (security evaluation value, performance evaluation value).

Furthermore, according to the first embodiment, the environment management station terminal 10, which is a third-party organization other than the network provider, calculates the evaluation values. Therefore, objectivity can be ensured in a manner such that the evaluation value is calculated by a public third-party organization not related to the service provider or the network provider.

Still further, according to the first embodiment, the network provider terminal 30 accepts the service request and the environment information from the service user terminal 40, transmits the environment information to the environment management station terminal 10 for requesting calculation of evaluation values, and then transmits the evaluation values received from the environment management station terminal 10 to the service provider terminal 20 together with the service request. Therefore, direct access from the service user terminal 40 to the service provider terminal 20 can be reduced, thereby distributing a load on the service provider terminal 20.

Still further, according to the first embodiment, when accepting the service request from the service user terminal 40, the network provider terminal 30 accepts a service ID for specifying the service (for example, a content number or the like) instead of a requested service detail (for example, the title of the content or the like). Therefore, it is possible to construct a framework in which the user preference (requested service detail) cannot be known by the network provider.

Still further, according to the first embodiment, when requesting the environment management station terminal 10 for calculation of evaluation values, the network provider terminal 30 transmits the service request ID that uniquely identifies the service request to the environment management station terminal 10 instead of the user ID of the user issuing the service request. Therefore, it is possible to construct a framework in which user information (user ID, user name, and others) cannot be known by the environment management station.

Still further, according to the first embodiment, when requesting the environment management station terminal 10 for calculation of an evaluation value, the network provider terminal 30 accepts the hashed environment information from the service user terminal 40 instead of the environment information itself, and then transmits the hashed environment information to the environment management station terminal 10. Therefore, it is possible to construct a framework in which the environment information itself cannot be known by the network provider. Also, in particular, by using the hashed environment information, the amount of information can be significantly reduced to also reduce communication traffic.

Meanwhile, in the first embodiment, when the environment information of the service user terminal 40 is transmitted to the environment management station terminal 10, the environment management station terminal 10 calculates evaluation values corresponding to the received environment information based on the evaluation DB 15a, and then transmits the calculated evaluation values to the service provider terminal 20. Alternatively, security of the service user terminal 40 may be more appropriately determined, and the evaluation value may be corrected according to the degree of security of the service user terminal 40.

Specifically, initial environment information of the service user terminal 40 at the time of factory shipment is obtained from a device vendor or the like and registered in advance. When the environment information is transmitted from the service user terminal 40 and evaluation values are calculated, if the initial environment information corresponding to the environment information has not been registered (that is, for example, if the initial environment information at the time of factory shipment has not been obtained from the device vendor or if the environment of the service user terminal 40 is different from the initial environment), it is determined that there is a concern about security, and the evaluation value is reduced accordingly, for example, thereby performing control of restricting the service to be provided to the service user terminal.

Also, in such cases, if registration of the initial environment information and calculation of evaluation values are performed by the environment management station terminal 10 explained in the first embodiment, the load on the environment management station terminal 10 is increased to reduce process efficiency when the number of service users is increased and many requests for evaluating the environment of the service user terminals 40 are made. To get around such a problem, in the second embodiment, a case is explained in which registration of the initial environment information of the service user terminal 40 and calculation of evaluation values of the service user terminal 40 are performed by different devices in a distributed manner.

Figure 16:
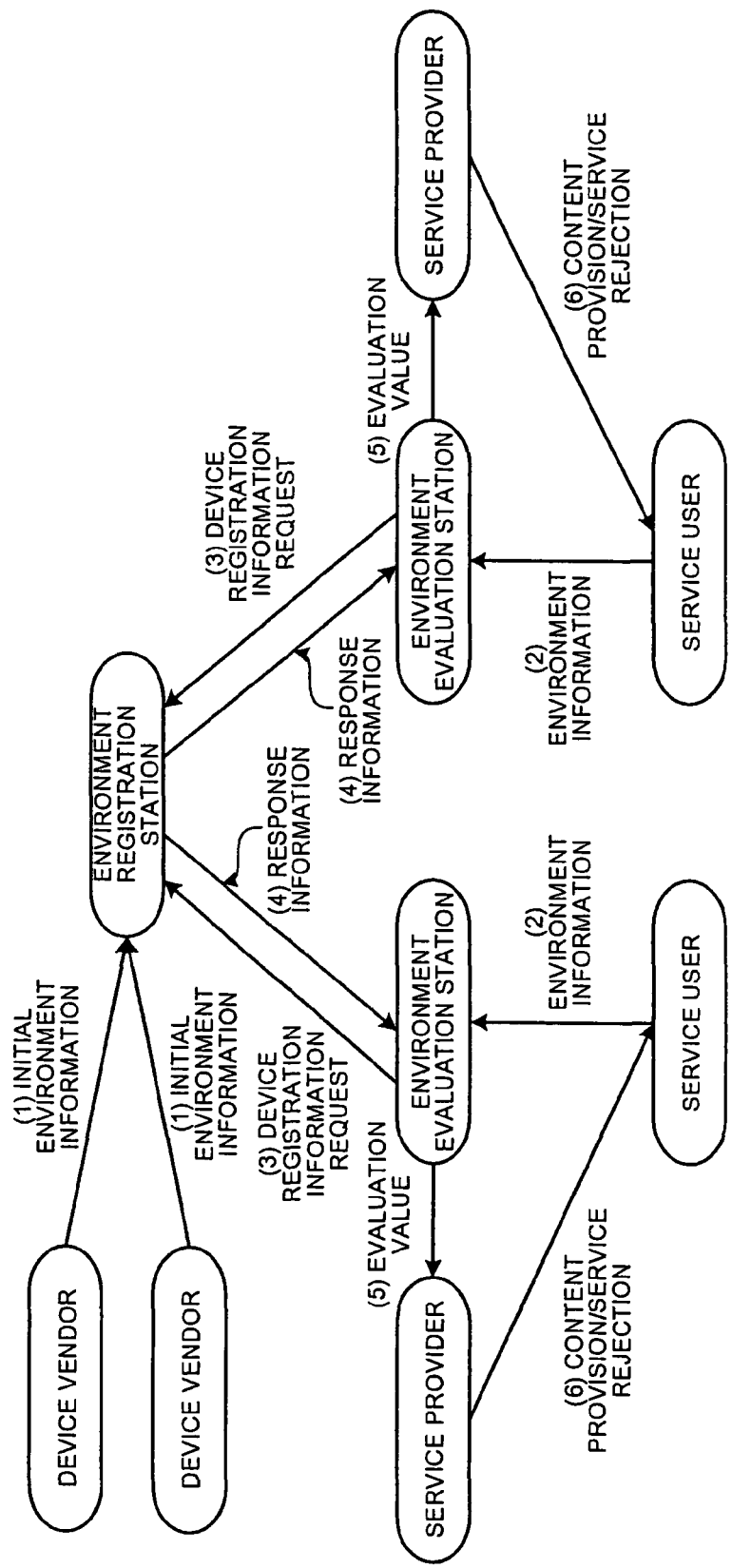
FIG. 16 is a drawing for explaining general outlines and features of a second embodiment.

First, by using FIG. 16, general outlines and features of a service controlling system according to the second embodiment is explained. FIG. 16 is a drawing for explaining the general outlines and features of the second embodiment.

In this service controlling system, the service provided to the service user is controlled in collaboration with an environment registration station, an environment evaluation station, a network provider (not shown), and a service provider.

The environment registration station terminal obtains information about software and hardware incorporated in the service user terminal at the time of factory shipment (initial environment information) from a device vendor terminal or the like, and registers the information in advance as device registration information (refer to (1) in FIG. 16).

Then, when the service user receives service provision from the service provider, the environment information of the service user terminal is transmitted through the network provider to the environment evaluation station terminal (refer to (2) in FIG. 16).

The environment evaluation station terminal checks to see whether initial environment information corresponding to the received environment information is stored in its own terminal. Here, in an initial state, it is assumed that initial environment information is not stored in the environment evaluation station terminal.

If initial environment information is not registered in its own terminal, the environment evaluation station terminal requests the environment registration station terminal to transmit device registration information (refer to (3) in FIG. 16). On the other hand, if initial environment information corresponding to the received environment information received by the environment evaluation station terminal is registered, the environment registration station terminal copies the initial environment information for transmission to the environment evaluation station terminal as response information (refer to (4) in FIG. 16).

If initial environment information corresponding to that environment information is not registered, a message indicating that no initial environment information is present is transmitted to the environment evaluation station terminal as response information (refer to (4) in FIG. 16).

The environment evaluation station terminal receiving that response information checks to see whether the initial environment information is registered in the environment registration station terminal. If the initial environment information is not registered, the environment evaluation station terminal determines that there is a possibility of having a problem in security of the service user terminal, and an evaluation value is calculated so as to be lower than the case where the initial environment information is registered, and then the calculated evaluation value is transmitted to the service provider terminal (refer to (5) in FIG. 16).

If the initial environment information is registered in the environment registration station terminal, the environment evaluation station terminal registers, in its own terminal, the initial environment information received from the environment registration station terminal, and also calculates an evaluation value as explained in the first embodiment and transmits the calculated evaluation value as it is through the network provider to the service provider terminal (refer to (5) in FIG. 16).

If the initial environment information has already been registered in the environment evaluation station terminal, the environment evaluation station terminal calculates an evaluation value as it is as explained in the first embodiment and transmits the calculated evaluation value through the network provider to the service provider terminal (refer to (5) in FIG. 16).

The service provider terminal determines, as explained in the first embodiment, whether the received evaluation value satisfies a service provision condition based on a service policy DB in which each service and service provision condition are associated with each other for service control, such as content provision or service rejection (refer to (6) in FIG. 16).

In this manner, in the service providing system according to the second embodiment, security of the service user terminal is checked before calculation of an evaluation value. Also, registration of the initial environment information is performed by the environment registration station terminal, whilst calculation of an evaluation value of the service user terminal is performed by the environment evaluation station terminal. Therefore, according to the degree of security of the service user terminal, the service to be provided to the service user terminal can be efficiently controlled. Also, the load associated with service control on each terminal can be distributed.

Figure 17:
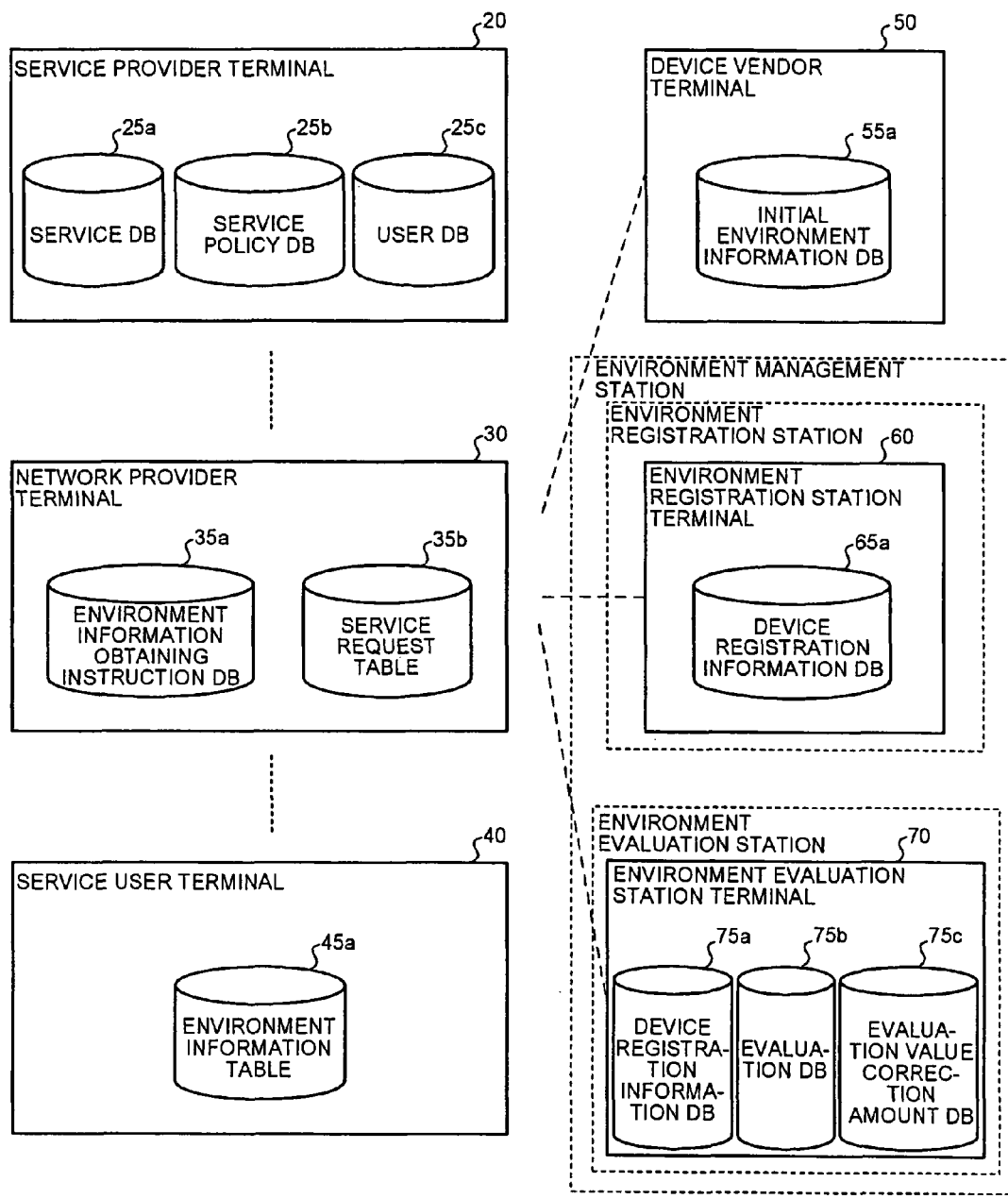
FIG. 17 is a drawing for explaining a process before service control.

Next, by using FIG. 17, a process before service control in the service controlling system according to the second embodiment is explained. FIG. 17 is a drawing for explaining the process before service control.

As depicted in FIG. 17, the service controlling system according to the second embodiment includes a device vendor terminal 50, an environment registration station terminal 60, an environment evaluation station terminal 70, a service provider terminal 20, a network provider terminal 30, and a service user terminal 40 that are communicably connected to each other via a network. Here, terminals similar to those in the first embodiment are provided with the same reference numerals. As the process before service control, each of the terminals 20 to 70 generates various types of means for storing (databases and tables), which will be explained further below.

The device vendor terminal 50 is a computer owned by a device vendor and includes, as depicted in FIG. 17 an initial environment information DB 55a. Here, the initial environment information DB 55a is a means for storing therein initial environment information of a terminal to be sold by the device vendor at the time of factory shipment, and specifically includes, as depicted in FIG. 19, a terminal ID for uniquely identifying the type of terminal to be sold by the device vendor and initial environment information of the terminal at the time of factory shipment in association with each other.

The environment registration station terminal 60 is a server computer owned by an environment registration station and includes, as depicted in FIG. 17, a device registration information DB 65a. Here, the device registration information DB 65a is a storage unit having stored therein initial environment information of a terminal received from the device vendor terminal 50 at the time of factory shipment, and specifically includes, as depicted in FIG. 20, a device vendor ID for uniquely identifying the device vendor, a terminal ID for uniquely identifying the type of terminal to be sold by the device vendor, initial environment information of the terminal at the time of factory shipment, and hashed initial environment information in association with each other.

The environment evaluation station terminal 70 is a server computer owned by an environment evaluation station, and includes, a depicted in FIG. 17, a device registration information DB 75a, an evaluation DB 75b, and an evaluation value correction amount DB 75c. Here, the device registration information DB 75a is the one obtained by copying part of information stored in the device registration information DB 65a of the environment registration station terminal 60 and is not shown in the drawing. As with FIG. 20, the device registration information DB 75a has stored therein a device vendor ID for uniquely identifying the device vendor, a terminal ID for uniquely identifying the type of terminal to be sold by the device vendor, initial environment information of the terminal at the time of factory shipment, and hashed initial environment information in association with each other.

The evaluation DB 75b is, as with the evaluation DB 15b explained in FIG. 4 of the first embodiment, a storage unit having stored therein evaluation values of vender products that can be incorporated in the service user terminal 40 and is not shown in the drawing. As depicted in FIG. 4, the evaluation DB 75b has stored therein environment information of the vendor product, hashed environment information, and evaluation values in association with each other.

Here, evaluation items including a "security evaluation value" and a "performance evaluation value" set in the evaluation DB 75b are determined between the service provider and the environment evaluation station, and are set by accepting an input of information about evaluation items from an from the service provider terminal 20 and an operator of the environment evaluation station. Also, if any service provided is desired to be restricted, such a restriction is set by accepting the environment information of that terminal and information about evaluation values set as being low from the service provider terminal 20. With such pieces of information being registered in the evaluation DB 75b, the service provided to that terminal is restricted.

The evaluation value correction amount DB 75c is a storage unit having stored therein information about a correction amount of the evaluation values when the evaluation value is lowered if the initial environment information of that terminal has not been registered in the environment registration station terminal 60. Specifically, as depicted in FIG. 21, a correction amount is stored correspondingly for each of evaluation values of security and performance, for example.

Here, in the second embodiment, the environment registration station and the environment evaluation station form an environment management station that manages information regarding the environment of the terminal. The service provider network 20, the network provider terminal 30, and the service user terminal 40 are similar to the service provider network 20, the network provider terminal 30, and the service user terminal 40 explained in the first embodiment, and therefore are not explained herein.

Figure 18:
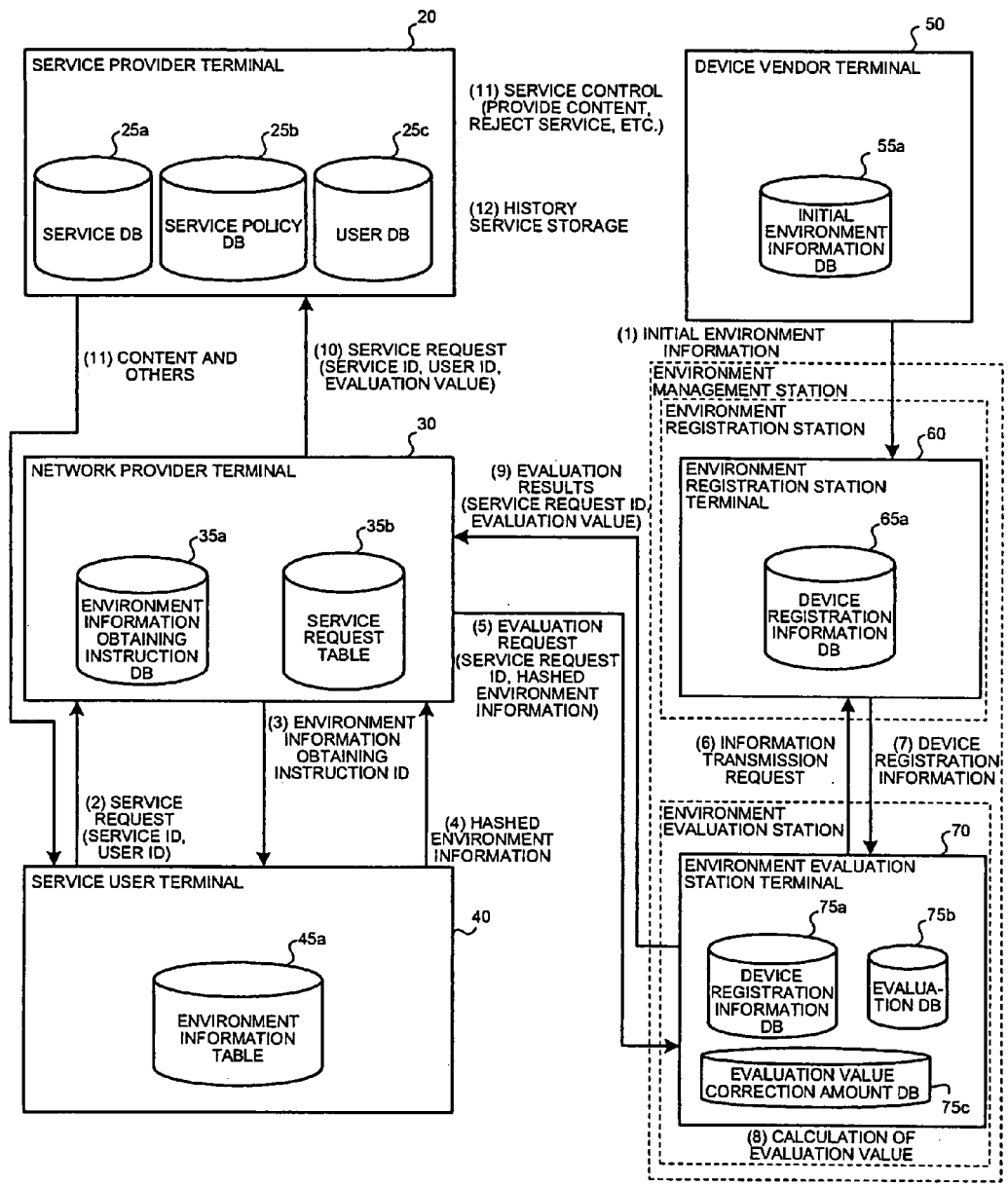
FIG. 18 is a drawing for explaining a process at the time of service control.

Next, by further using FIG. 18, a process at the time of service control in the service controlling system according to the second embodiment is explained. FIG. 18 is a drawing for explaining the process at the time of service control. Here, it is assumed that initial environment information of a terminal to be sold by the device vendor at the time of factory shipment is transmitted from the device vendor terminal 50 to the environment registration station terminal 60 and the initial environment information is registered in advance in the environment registration station terminal 60 as the device registration information DB 65a (refer to (1) in FIG. 18).

Then, when a service request message (for example, an HTTP message) formed of the service ID and the user ID is transmitted from the service user terminal 40 to the network provider terminal 30, the network provider terminal 30 issues a service request ID, and associates these "service request ID, service ID, and user ID" with each other for registration in the service request table 35b (refer to (2) in FIG. 18). Here, the network provider terminal 30 accepts the service ID as a service request instead of a service detail (for example, the title of a content) from the service user terminal 40.

The network provider terminal 30 accepting such a service request reads an environment information obtaining instruction ID corresponding to the service ID from the environment information obtaining instruction DB 35a, and then transmits the environment information obtaining instruction ID to the service user terminal 40 (refer to (3) in FIG. 18). Then, the service user terminal 40 receiving the environment information obtaining instruction ID reads environment information defined in this environment information obtaining instruction ID from the environment information table 45a, and then transmits hashed environment information obtained by hashing the environment information to the network provider terminal 30 (refer to (4) in FIG. 18).

Then, the network provider terminal 30 then registers the hashed environment information in the service request table 35b, and also transmits this hashed environment information and its corresponding service request ID to the environment evaluation station terminal 70 for requesting calculation of evaluation values (refer to (5) in FIG. 18). The environment evaluation station terminal 70 receiving this request checks to see whether initial environment information of the terminal corresponding to the hashed environment information included in the request has been registered in the device registration information DB 75a. If initial environment information of the terminal is not registered, the hashed environment information is transmitted to the environment registration station terminal 60 for requesting transmission of registration information of the initial environment information of the terminal corresponding to the hashed environment information (refer to (6) in FIG. 18). Here, if the environment of the service user terminal 40 is different from the environment at the time of factory shipment, this means that initial environment information is not found.

The environment registration station terminal 60 searches, in response to the request from the environment evaluation station terminal 70, whether initial environment information of the terminal corresponding to the hashed environment information is registered in the device registration information DB 65a. If initial environment information of the terminal is registered (if environment information at the time of factory shipment matching with the environment information of the service user terminal 40 is present), that initial environment information is transmitted to the environment evaluation station terminal 70. If initial environment information of the terminal is not registered (if environment information at the time of factory shipment matching with the environment information of the service user terminal 40 is not found), information indicating non-registration is transmitted to the environment evaluation station terminal 70 (refer to (7) in FIG. 18).

When receiving from the environment registration station terminal 60 the information indicating that the initial environment information of the terminal is not registered, the environment evaluation station terminal 70 reads information about a correction amount for correcting an evaluation value in a decreasing manner from the evaluation value correction amount DB 75c, and further reads evaluation values corresponding to the hashed environment information from the evaluation DB 75a to calculate a corrected evaluation value by using the correction amount (refer to (8) in FIG. 18).

If initial environment information of the terminal corresponding to the hashed environment information included in the evaluation request is registered in the device registration information DB 75a of the environment evaluation station terminal 70 or the device registration information DB 65a of the environment registration station terminal 60, the environment evaluation station terminal 70 reads evaluation values corresponding to the hashed environment information included in the request from the evaluation DB 75a, thereby calculating evaluation values (refer to (8) in FIG. 18). Furthermore, the environment evaluation station terminal 70 transmits evaluation results formed of the calculated "evaluation values" and the "service request ID" included in the request to the network provider terminal 30 (refer to (9) in FIG. 18).

Then, the network provider terminal 30 registers the evaluation values received from the environment evaluation station terminal 70 in the service request table 35b, and transmits a service request formed of the "service ID, user ID, and evaluation values" registered in the service request table 35b to the service provider terminal 20 (refer to (10) in FIG. 18). On the other hand, the service provider terminal 20 receiving the service request from the network provider terminal 30 refers to the service policy DB 25b to determine whether the evaluation values included in the service request satisfy the service provision condition of the service ID also included in the service request, thereby controlling the service to be provided to the service user terminal 40 (refer to (11) in FIG. 18).

Furthermore, the service provider terminal 20 registers service history in the user DB 25c after service control (refer to (12) in FIG. 18). That is, in association with the user ID and user name of the service user issuing the service request, service history formed of the service control date and time, the service ID, the evaluation values for use in service control, and service control execution results is registered in the user DB 25c. With a series of processes explained above, the service can be controlled without the service provider obtaining the environment information regarding the service user terminal 40.

Next, by using FIG. 22, the configuration of the device vendor terminal 50 is explained. FIG. 22 is a block diagram of the configuration of the device vendor terminal 50. As depicted in the drawing, the device vendor terminal 50 includes an input unit 51, an output unit 52, an input/output control I/F unit 53, a communication control I/F unit 54, a storage unit 55, and a controlling unit 56.

Among these, the input unit 51 is a means for inputting various types of information and is configured of a keyboard, a mouse, or a microphone. For example, the input unit 51 accepts, from an operator of the device vendor, various types of information stored in the initial environment information DB 55a explained above for input. Here, a monitor (output unit 52), which will be explained below, also achieves a pointing device function in conjunction with the mouse.

The output unit 52 is a means for outputting various types of information and is configured of a monitor (or a display or a touch panel) or a loudspeaker. For example, the output unit 52 outputs various types of information stored in the initial environment information DB 55a. The input/output control I/F unit 53 is a means for controlling inputs and outputs of data by these input unit 51 and the output unit 52, whilst the communication control I/F unit 54 is a unit that controls communication mainly with the environment registration station terminal 60.

The storage unit 55 is a means (holding means) for storing therein data and programs required for various processes by the controlling unit 56. In particular, the storage unit 55 closely related to the present invention includes the initial environment information DB 55a, as depicted in FIG. 22. Here, as explained above, the initial environment information DB 55a is a means for storing therein initial environment information of a terminal to be sold by the device vendor at the time of factory shipment (refer to FIG. 19).

The controlling unit 56 is a means with an internal memory for storing therein programs and control data defining various types of procedures and performing these various processes with the programs and control data. In particular, the controlling unit 56 closely related to the present invention includes an information managing unit 56a, as depicted in FIG. 22.

Here, the information managing unit 56a is a processing unit that manages the initial environment information of the terminal. Specifically, the information managing unit 56a accepts an input of the initial environment information of the terminal, stores the accepted information in the initial environment information DB 55a, and also reads initial environment information of the terminal from the initial environment information DB 55a for transmission to the environment registration station terminal 60.

Figure 23:
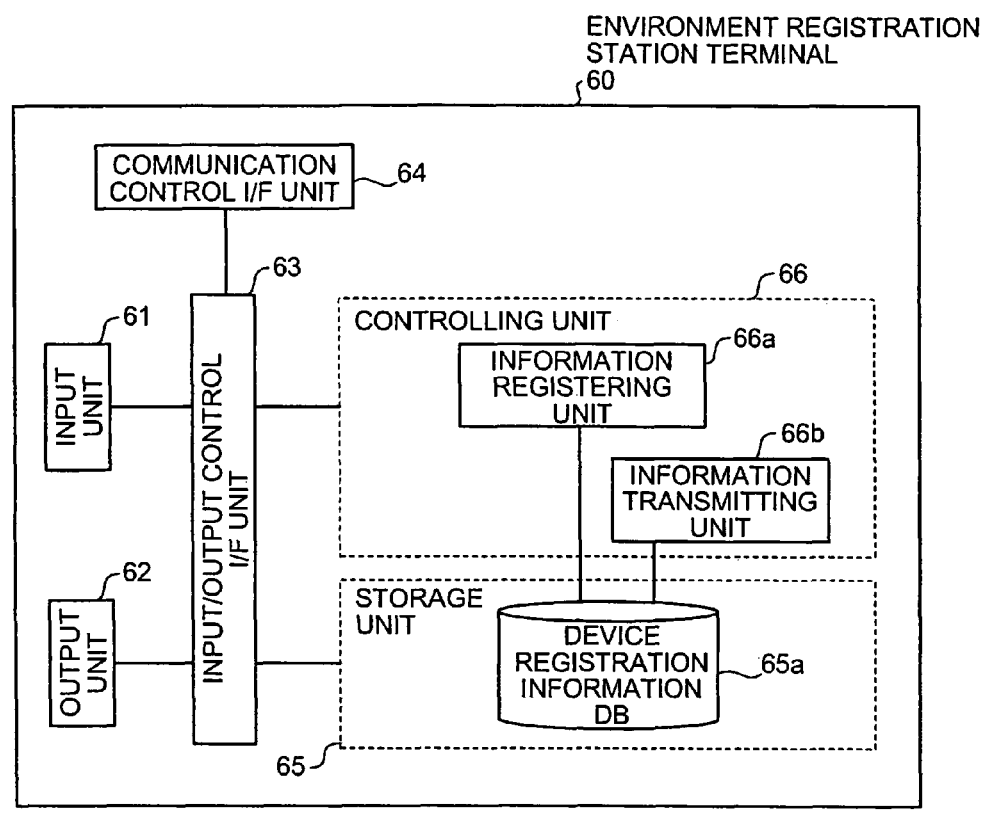
FIG. 23 is a block diagram of the configuration of an environment registration station terminal.

Next, by using FIG. 23, the configuration of the environment registration station terminal 60 is explained. FIG. 23 is a block diagram of the configuration of the environment registration station terminal 60. As depicted in the drawing, the environment registration station terminal 60 includes an input unit 61, an output unit 62, an input/output control I/F unit 63, a communication control I/F unit 64, a storage unit 65, and a controlling unit 66.

Among these, the input unit 61 is a means for inputting various types of information and is configured of a keyboard, a mouse, or a microphone. For example, the input unit 61 accepts inputs of various types of information from an operator. Here, a monitor (output unit 62), which will be explained below, also achieves a pointing device function in conjunction with the mouse.

The output unit 62 is a means for outputting various types of information and is configured of a monitor (or a display or a touch panel) or a loudspeaker. For example, the output unit 62 outputs various types of information stored in the device registration information DB 65a. The input/output control I/F unit 63 is a means for controlling inputs and outputs of data by these input unit 61 and the output unit 62, whilst the communication control I/F unit 64 is a means for controlling communication mainly between the device vendor terminal 50 and the environment evaluation station terminal 70.

The storage unit 65 is a means (holding means) for storing therein data and programs required for various processes by the controlling unit 66. In particular, the storage unit 65 closely related to the present invention includes the device registration information DB 65a, as depicted in FIG. 23. Here, as explained above, the device registration information DB 65a is a means for storing therein initial environment information of a terminal to be sold by the device vendor terminal 50 at the time of factory shipment (refer to FIG. 20).

The controlling unit 66 is a means with an internal memory for storing therein programs and control data defining various types of procedures and performing these various processes with the programs and control data. In particular, the controlling unit 66 closely related to the present invention includes an information registering unit 66a and an information transmitting unit 66b, as depicted in FIG. 23.

Here, the information registering unit 66a is a processing unit that registers, in the device registration information DB 65a, the device vendor ID, the terminal ID, the initial environment information of the terminal, and the hashed initial environment information obtained by hashing the initial environment information of the terminal received from the device vendor terminal in association with each other. The information transmitting unit 66b is a processing unit that transmits the registration information of the terminal to the environment evaluation station terminal 70 when transmission of the registration information of the terminal is requested from the environment evaluation station terminal 70.

Figure 24:
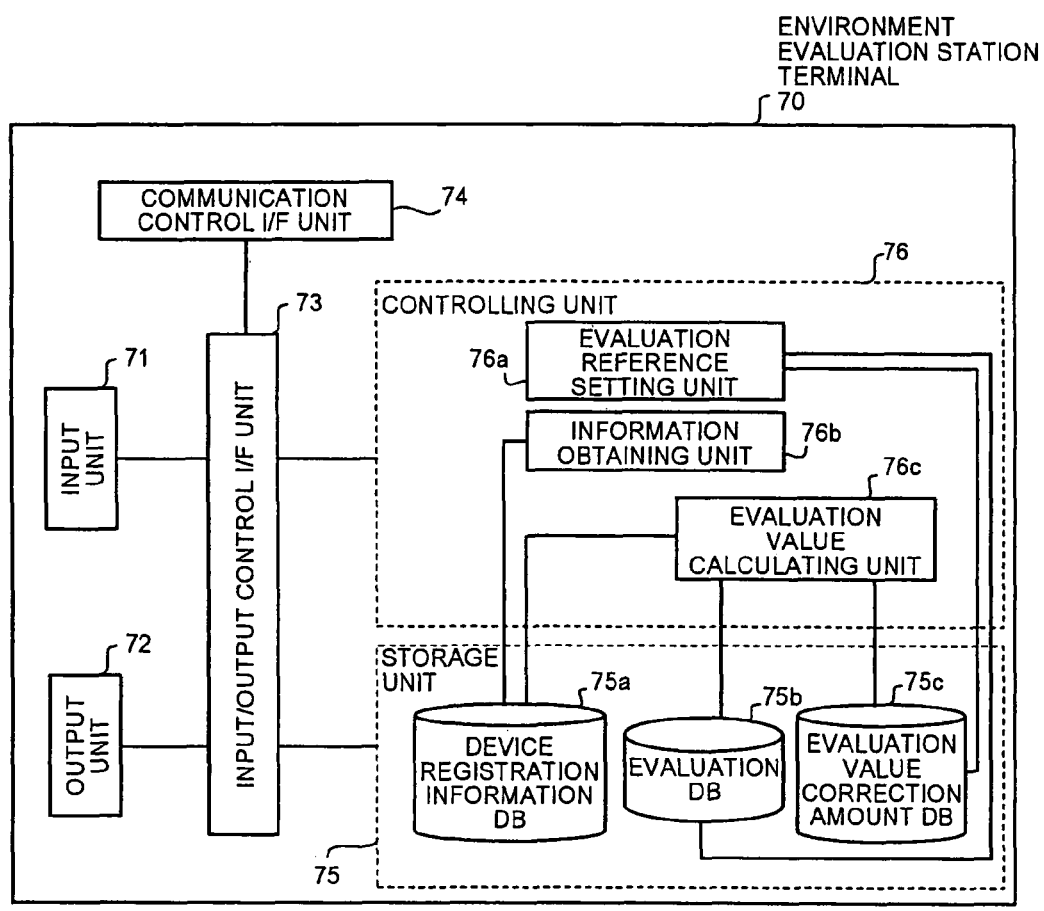
FIG. 24 is a block diagram of the configuration of an environment evaluation station terminal.

Next, by using FIG. 24, the configuration of the environment evaluation station terminal 70 is explained. FIG. 24 is a block diagram of the configuration of the environment evaluation station terminal 70. As depicted in the drawing, the environment evaluation station terminal 70 includes an input unit 71, an output unit 72, an input/output control I/F unit 73, a communication control I/F unit 74, a storage unit 75, and a controlling unit 76.

Among these, the input unit 71 is a means for inputting various types of information and is configured of a keyboard, a mouse, or a microphone. For example, the input unit 71 accepts inputs of various types of information from an operator. Here, a monitor (output unit 72), which will be explained below, also achieves a pointing device function in conjunction with the mouse.

The output unit 72 is a means for outputting various types of information and is configured of a monitor (or a display or a touch panel) or a loudspeaker. For example, the output unit 72 outputs various types of information stored in the device registration information DB 75a, the evaluation DB 75b, and the evaluation value correction amount DB 75c. The input/output control I/F unit 73 is a means for controlling inputs and outputs of data by these input unit 71 and the output unit 72, whilst the communication control I/F unit 74 is a means for controlling communication mainly between the network provider terminal 30 and the environment registration station terminal 60.

The storage unit 75 is a means (holding means) for storing therein data and programs required for various processes by the controlling unit 76. In particular, the storage unit 55 closely related to the present invention includes the device registration information DB 75a, the evaluation DB 75b, the evaluation value correction amount DB 75c, as depicted in FIG. 24.

Here, as explained above, the device registration information DB 75a is a means for storing therein a copy of par of information stored in the device registration information DB 65a of the environment registration station terminal 60. The evaluation DB 75b is a means for storing therein evaluation values of vendor products that can be incorporated in the service user terminal 40. The evaluation value correction amount DB 75c is a means for storing therein information about a correction amount of the evaluation values when initial environment information of the terminal is not registered in the environment registration station terminal 60 and the evaluation values are decreased (refer to FIG. 21).

The controlling unit 76 is a means with an internal memory for storing therein programs and control data defining various types of procedures and performing these various processes with the programs and control data. In particular, the controlling unit 76 closely related to the present invention includes an evaluation reference setting unit 76a, an information obtaining unit 76b, and an evaluation value calculating unit 76c, as depicted in FIG. 24.

The evaluation reference setting unit 76a sets information of each item to be considered as an evaluation value, such as a "security evaluation value" and a "performance evaluation value", by accepting such information from the service provider terminal 20, and sets each of the set items in the evaluation DB 75b and the evaluation value correction amount DB 75c. Then, for each item, the evaluation reference setting unit 76a associates the evaluation values input by the operator and others and the correction amount of the evaluation values with each item for storage in the evaluation DB 75b and the evaluation value correction amount DB 75c.

Furthermore, the evaluation reference setting unit 76a sets environment information of a terminal for which the service to be provided is restricted and information of the evaluation values set lower for that terminal by accepting these pieces of information from the service provider terminal 20, and then registers these pieces of information in the evaluation DB 75b, thereby restricting the service to be provided to that terminal.

The information obtaining unit 76b is a processing unit that obtains registration information of the terminal from the environment registration station terminal 60. Specifically, as explained in the first embodiment, when receiving from the network provider terminal 30 an evaluation request formed of the hashed environment information and the service request ID, the information obtaining unit 76b checks to see whether initial environment information of the terminal corresponding to the hashed environment information included in the request is registered in the device registration information DB 75a of its own terminal.

If initial environment information of the terminal is not registered in the device registration information DB 75a, the information obtaining unit 76b transmits the hashed environment information to the environment registration station terminal 60 to request the environment registration station terminal 60 to transmit the registration information of the initial environment regarding the terminal corresponding to the hashed environment information. Then, the information obtaining unit 76b receives, from the environment registration station terminal 60, the initial environment information of the terminal corresponding to the hashed environment information or information indicating that initial environment information of the terminal corresponding to the hashed environment information is not registered. If the initial environment information of the terminal is received, this initial environment information is stored in the device registration information DB 75a.

The evaluation value calculating unit 76c is a processing unit that evaluates the environment regarding the service user terminal 40 and calculates evaluation values. Specifically, when information indicating that initial environment information of the terminal is not registered is received from the environment registration station terminal 60, the evaluation value calculating unit 76c reads information about a correction amount for decreasing an evaluation value from the evaluation value correction amount DB 75c for correction, and further reads evaluation values corresponding to the hashed environment information from evaluation DB 75*a* to calculate corrected evaluation values by using the correction amount.

If initial environment information of the terminal corresponding to the hashed environment information is registered in the device registration information DB 75*a* of the environment evaluation station terminal 70 or the device registration information DB 65*a* of the environment registration station terminal 60, the evaluation value calculating unit 76*c* reads evaluation values corresponding to the hashed environment information from the evaluation DB 15*a* to calculate evaluation values.

Figure 25:
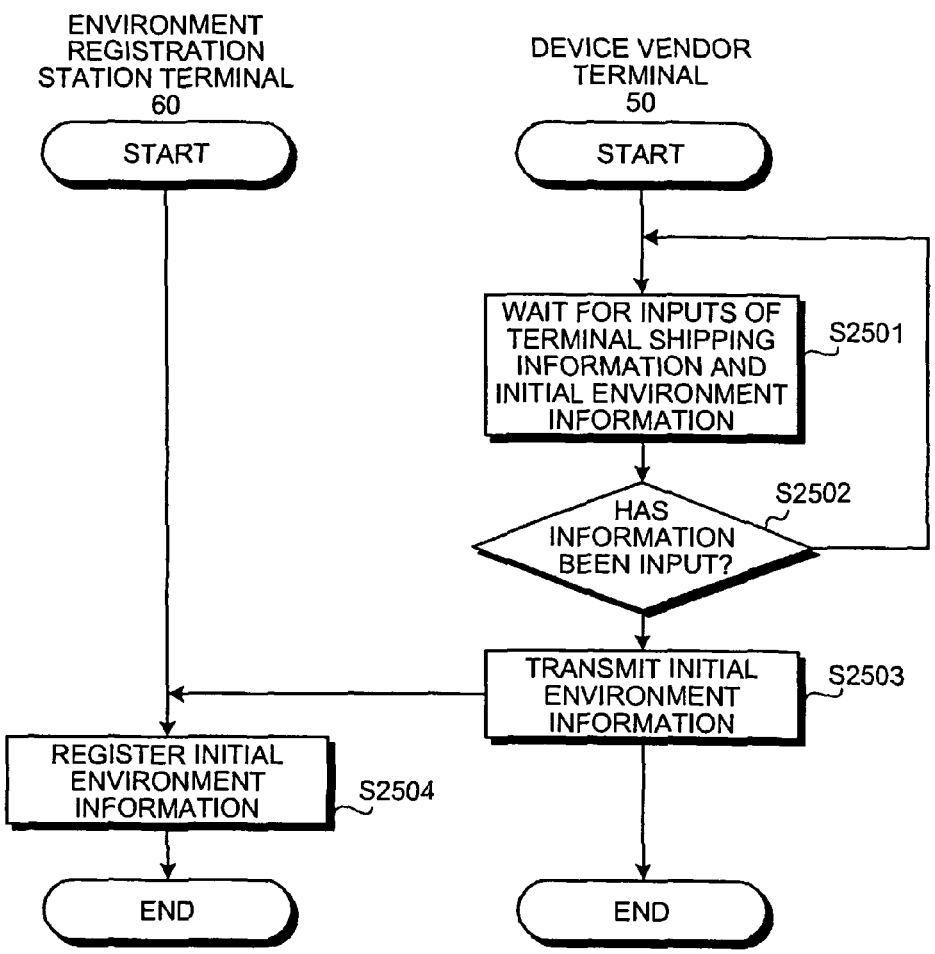
FIG. 25 is a flowchart of a process before service control.

Next, by using FIG. 25, a procedure before service control by the service controlling system according to the second embodiment is explained. FIG. 25 is a flowchart of the process before service control.

As depicted in the drawing, the device vendor terminal 50 waits for inputs of shipping information of the terminal and initial environment information of the terminal from an operator to the device vendor terminal 50 (step S2501) to check whether these pieces of information have been input (step S2502). If the shipping information and the initial environment information of the terminal have not been input (No at step S2502), the device vendor terminal 50 continues to perform a process of waiting for inputs of the shipping information and initial environment information (step S2501).

If the shipping information and the initial environment information of the terminal have been input (Yes at step S2502), the device vendor terminal 50 transmits the initial environment information to the environment registration station terminal 60 (step S2503). Then, the environment registration station terminal 60 receiving the initial environment information registers the initial environment information in the device registration information DB 65*a* (step S2504).

Figure 26:
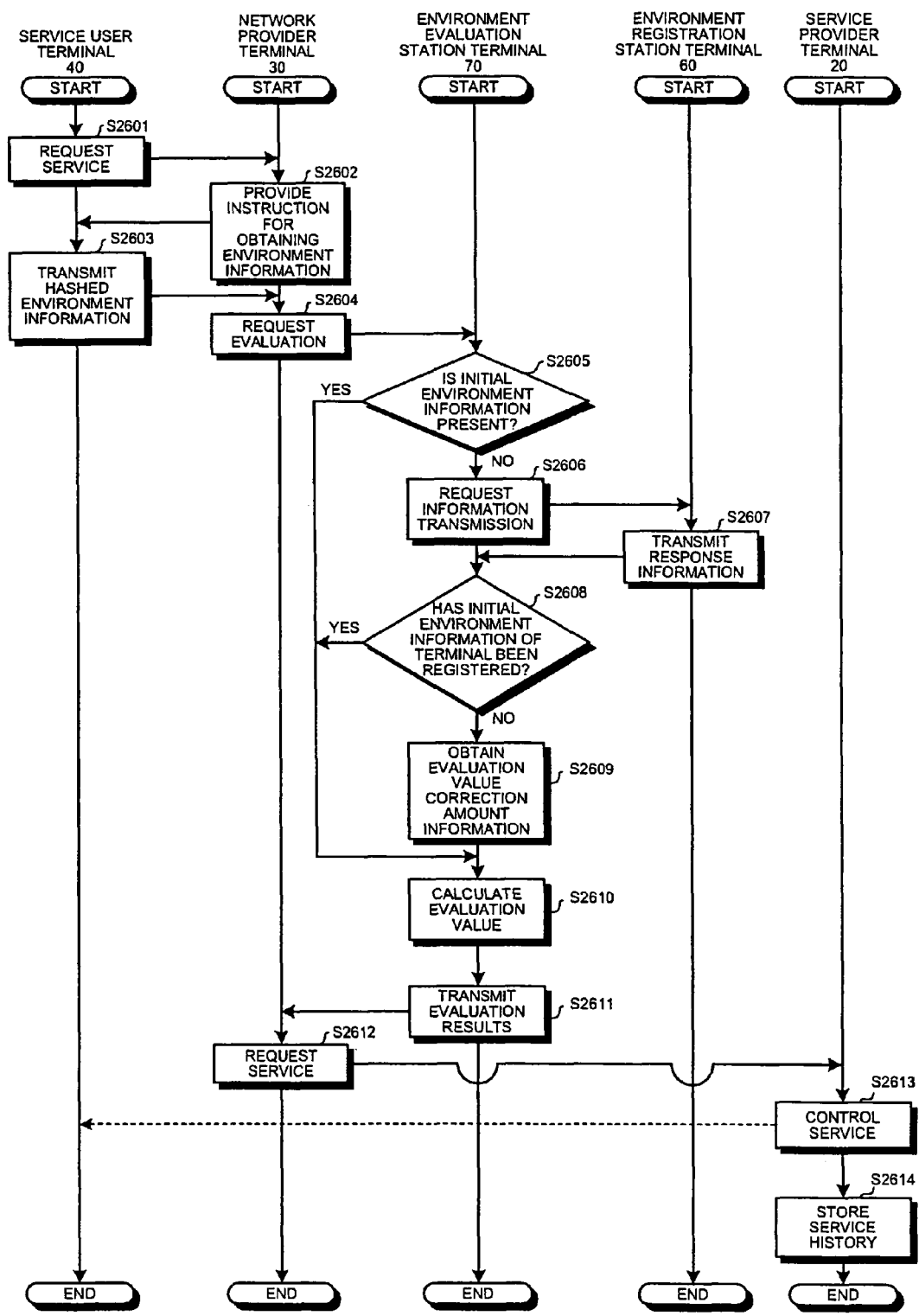
FIG. 26 is a flowchart of a process at the time of service control.

Next, by using FIG. 26, a procedure at the time of service control by the service controlling system according to the second embodiment is explained. FIG. 26 is a flowchart of the process at the time of service control.

As depicted in the drawing, when a service request message formed of the service ID and the user ID is transmitted from the service user terminal 40 to the network provider terminal 30 (step S2601), the network provider terminal 30 issues a service request ID, registers the service request ID, the service ID, and the user ID in the service request table 35*b* in association with each other, and also reads an environment information obtaining instruction ID corresponding to the service ID from the environment information obtaining instruction DB 35*a* for transmission to the service user terminal 40 (step S2602).

On the other hand, the service user terminal 40 receiving the environment information obtaining instruction ID reads environment information defined in this environment information obtaining instruction ID from the environment information table 45*a*, and transmits hashed environment information obtained by hashing the environment information to the network provider terminal 30 (step S2603). Then, the network provider terminal 30 registers the hashed environment information in the service request table 35*b*, and transmits this hushed environment information and its corresponding service request ID to the environment evaluation station terminal 70 for requesting calculation of evaluation values (step S2604).

Then, the environment evaluation station terminal 70 receiving such an evaluation request checks whether initial environment information of the terminal corresponding to the hashed environment information is registered in the device registration information DB 75*a* (step S2605). If initial environment information of the terminal is not registered in the device registration information DB 75*a* (No at step S2605), the environment evaluation station terminal 70 requests the environment registration station terminal 60 to transmit registration information of the terminal corresponding to the hashed environment information (step S2606).

Upon accepting the request for transmitting the registration information from the environment evaluation station terminal 70, the environment registration station terminal 60 searches, in response to the request, whether initial environment information of the terminal corresponding to the hashed environment information is registered in the device registration information DB 65*a*. If initial environment information of the terminal is registered, that information is transmitted to the environment evaluation station terminal 70 as response information. If initial environment information of the terminal is not registered, information indicating non-registration is transmitted to the environment evaluation station terminal 70 as the response information (step S2607).

The environment evaluation station terminal 70 receives the response information transmitted from the environment registration station terminal 60 to check whether initial environment information of the terminal corresponding to the hashed environment information is registered in the device registration information DB 65*a* of the environment registration station terminal 60 (step S2608). If initial environment information of the terminal is not registered in the device registration information DB 65*a* (No at step S2608), the environment evaluation station terminal 70 obtains, from the evaluation value correction amount DB 75*c*, information about a correction amount for decreasing the evaluation amount for correction (step S2609), reads evaluation values corresponding to the hashed environment information to calculate evaluation values corrected by using the correction amount (step S2610).

If it is determined at step S2605 that initial environment information of the terminal corresponding to the hashed environment information is registered in the device registration information DB 75*a* of the environment evaluation station terminal 70 (Yes at step S2605), or if it is determined at step S2608 that initial environment information of the terminal corresponding to the hashed environment information is registered in the device registration information DB 65*a* of the environment registration station terminal 60 (Yes at step S2608), the environment evaluation station terminal 70 reads evaluation values corresponding to the hashed environment information from the evaluation DB 75*a* to calculate uncorrected evaluation values (step S2610).

Then, the environment evaluation station terminal 70 transmits evaluation results formed of the evaluation value and the service request ID to the network provider terminal 30 (step S2611). Then, the network provider terminal 30 registers the evaluation values received from the environment evaluation station terminal 70 in the service request table 35*b*, and also transmits a service request formed of the "service ID, use ID, and evaluation values" registered in the service request table 35*b* to the service provider terminal 20 (step S2612).

Then, the service provider terminal 20 receiving the service request from the network provider terminal 30 refers to the service policy DB 25*b* to determine whether the evaluation values included in the service request satisfy the service provision condition of the service ID also included in the same service request, thereby controlling the service to be provided to the service user terminal 40 (step S2613). That is, for example, service control is performed according to the service policy defined in the service policy DB 25*b* in a manner such that the requested content is read from the service DB 25*a* and is provided only to the service user terminal 40 satisfying the evaluation values of the service provision condition.

Furthermore, after service control is performed, in association with the user ID and the user name of the service user issuing the service request, the service provider terminal 20 registers, in the user DB 25*c*, service history formed of the service control date and time, the service ID, the evaluation values for use in service control, and service control execution results (step S2614).

As explained above, according to the second embodiment above, the environment registration station terminal 60 includes a unit that accepts registration of initial environment information regarding a terminal for use by a user. The environment evaluation station terminal 70 determines whether the environment registration station terminal 60 has accepted registration of initial environment of the information regarding the terminal. Based on the determination result, evaluation values are calculated. Therefore, when there is a concern about security of the terminal because an initial environment information regarding the terminal is not registered in advance, the evaluation values are decreased, for example, thereby achieving service control in consideration of security.

Also, the environment registration station terminal 60 connected through a network to the environment evaluation station terminal 70 that evaluates the environment regarding the user terminal and calculates evaluation values is provided with the unit that accepts registration of the initial environment information regarding the terminal used by the user. The environment evaluation station terminal 70 obtains registration information regarding the terminal through the network form the environment registration station terminal 60. Based on the registration information, the environment evaluation station terminal 70 determines whether registration of the information regarding the terminal has been accepted. Based on the determination result, evaluation values are calculated. Therefore, registration of the initial environment information and calculation of evaluation values regarding the terminal are performed in a distributed manner at different terminals. Thus, the load on each terminal regarding the service control can be reduced, thereby also efficiently performing service control.

Also, when accepting a service request from the service user terminal 40, the environment evaluation station terminal 70 obtains registration information regarding the terminal from the environment registration station terminal 60. Therefore, by obtaining the registration information from the environment registration station terminal 60 as required, the environment evaluation station terminal 70 does not have to hold the registration information regarding the terminal in advance, thereby reducing the storage capacity required for the storage unit of the environment evaluation station terminal 70.

Furthermore, a unit that sets an evaluation reference for calculating evaluation values is further provided to the environment evaluation station terminal 70. Based on the evaluation reference set by that unit, the environment evaluation station terminal 70 evaluates the environment regarding the service user terminal 40 to calculate evaluation values. Therefore, a determination of a service to be provided to the service user terminal 40 can be made appropriately. Furthermore, a service user terminal 40 providing a service can also be restricted.

Meanwhile, while the embodiments of the present invention have been explained in the foregoing, other than the first and second embodiments explained above, the present invention can be implemented by various different embodiments.

In the following, another embodiment included in the present invention is explained as a third embodiment.

(1) In View of Evaluation

For example, in the first and second embodiments, the case has been explained in which a security evaluation value and a performance evaluation value are determined for each vender product (software and hardware) (refer to FIG. 4). However, the present invention is not restricted to this. For example, the present invention can be similarly applied to any case as long as the case is such that one or a plurality of evaluation values are arbitrarily determined, for example, a case such that only the security evaluation value is determined for each vendor product, only the performance evaluation value is determined, only one evaluation value is determined from another viewpoint, or not only evaluation values from a plurality of viewpoints but also a total evaluation value is determined.

Furthermore, the present invention is not restricted to the case where such evaluation values are determined for each vendor product, but a plurality of vendor products may be evaluated as a whole to determine an evaluation value. Specifically, for example, based on composite environment information sent from the service user terminal 40 (for example, environment information formed of environment information of one piece of software and environment information of one piece of hardware), a total evaluation value may be calculated for each combination of the vendor products, instead of calculating an evaluation value for each vendor product.

(2) Service Provision Condition

Still further, in the first and second embodiments, the case has been explained where either one or both of a security evaluation value and a performance evaluation value are defined as a service provision condition (refer to FIG. 6). This present invention is not restricted to this. As explained in the "evaluation values" above, the present invention can be similarly applied to any case as long as one or plurality of evaluation values are arbitrarily used as a service provision condition.

Still further, in the first and second embodiments, the case has been explained where only the evaluation values for the environment information are used for service control. The present invention is not restricted to this, and the service may be controlled based on not only the evaluation values but a service provision period and also a user attribute. Specifically, for example, the evaluation value as the service provision condition may be changed to be decreased only during a campaign period or only for the special-member users. With this, various service controls not necessarily restricted by the environment information of the user terminal 40 can be achieved.

(3) Service Control Detail

Still further, in the first and second embodiments, the case has been explained where service control is performed in which whether to perform the service depends on the evaluation values for the environment information of the service user terminal 40. The present invention is not restricted to this. For example, the present invention can also be similarly applied to any case as long as service control uses the evaluation values, such that the network is interrupted or a process required for performing the service (for example, a process for improving security) is suggested according to the evaluation values.

(4) Encryption of Environment Information and Others

Still further, in the first and second embodiments, the case has been explained where the hashed environment information is transmitted from the service user terminal 40 to the environment management station terminal 10. The present invention is not restricted to this. For example, encrypted environment information may be transmitted. Furthermore, the present invention can also be applied to the case where the environment information itself may be transmitted to the environment management station terminal 10, although the environment information itself is to be known to the network provider.

(5) Encryption of Evaluation Value and Others

Still further, in the first and second embodiments, the case has been explained where the evaluation values themselves are transmitted from the environment management station terminal 10 to the service provider terminal 20. The present invention is not restricted to this, and encrypted evaluation values may be transmitted. With this, a framework can be constructed in which the evaluation values for the environment information of the service user terminal 40 cannot be known to the network provider.

Still further, in the first and second embodiments, the case has been explained where an environment information obtaining instruction ID is used for the purpose of transmitting the environment information from the service user terminal 40. The present invention is not restricted to this. For example, always similar environment information (for example, environment information regarding all devices incorporated in the service user terminal 40) may be transmitted without using an environment information obtaining instruction ID. In this case, an environment information obtaining instruction ID does not have to be defined for each service (content). Also, the network provider terminal 30 can accept the service request and the environment information at one time from the service user terminal 40.

(6) Place Where Evaluation Value is Calculated

Still further, in the first and second embodiments, the case has been explained where evaluation values are calculated at the environment management station terminal 10. The present invention is not restricted to this. For example, the present invention can be similarly applied to any case as long as evaluation values are calculated at a place away from the service provider, such that evaluation values are calculated at the network provider terminal 30 or at the service user terminal 40.

(7) Other Services

Figure 27:
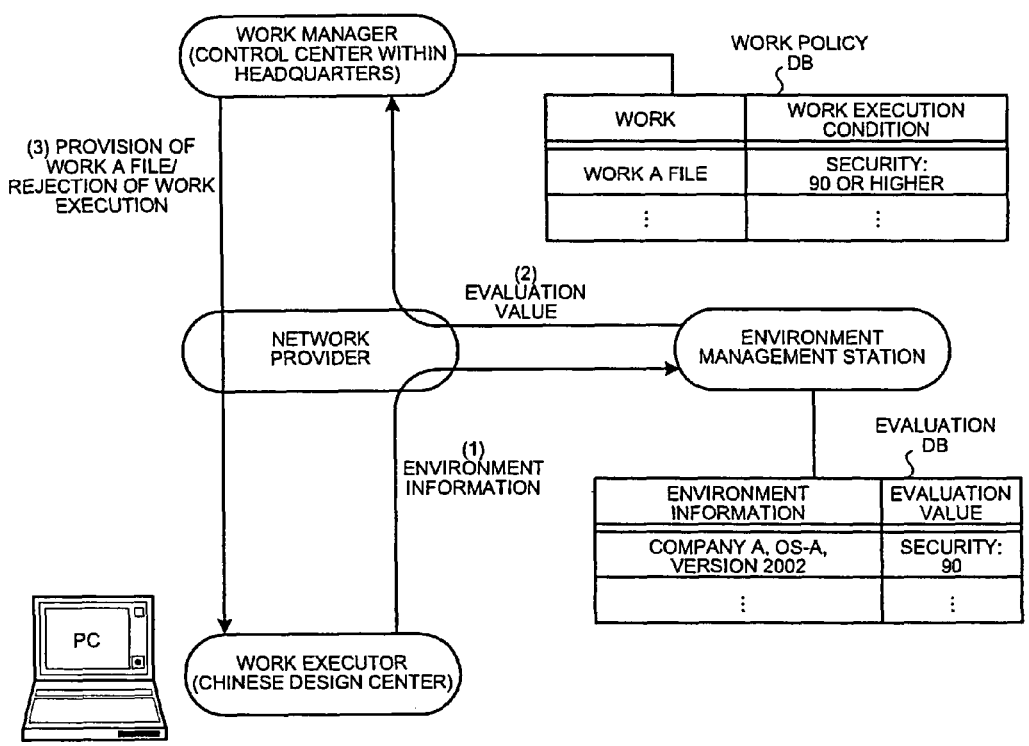
FIG. 27 is a drawing for explaining other embodiments.

Still further, in the first and second embodiments, the case has been explained where the present invention is applied to a service that provides a content. The present invention is not restricted to this. The present invention can be similarly applied to any case as long as a service can be provided via a network. FIG. 27 is an exemplary drawing for explaining still another embodiment. As depicted in the drawing, in a service where a work file, such as a design specification, is provided from a work manager (corresponding to the "service provider" above) to a work executor (corresponding to the "service user" above), the present invention can be similarly applied to a case where the work file is transmitted only to the terminal not having low evaluation scores (for example, an invulnerable terminal, a terminal not with a low performance, etc) to allow work execution.

(8) System Configuration and Others

Among the processes explained in the present embodiments, all or part of the processes explained as being automatically performed can be performed manually, or all or part of the processes explained as being manually performed can be performed automatically with a known method. In addition, the information about the process procedure, the control procedure, specific names, various types of data and parameters mentioned herein and in the drawings (in particular, examples of the information depicted in FIGS. 4 to 10 and FIGS. 19 to 21) can be arbitrarily changed unless otherwise specified.

Still further, each component of the depicted respective devices (environment management station terminal 10, service provider terminal 20, network provider terminal 30, service user terminal 40, device vendor terminal 50, environment registration station terminal 60, and environment evaluation station terminal 70) is functionally conceptual, and is not necessarily configured physically as depicted in the drawings. That is, specific forms of distribution and unification of the respective devices are not restricted to those depicted in the drawings. For example, the environment management station terminal 10 and the network provider terminal 30 may be integrated. As such, all or part of the devices can be functionally or physically distributed or unified in arbitrary units according to various loads and use states. Still further, all or part of process functions at the respective devices may be achieved by a CPU or a program analyzed and executed by the CPU, or may be achieved as hardware with a wired logic.

Here, various process procedures explained in the embodiments can be achieved by a program prepared in advance being executed by a computer, such as a personal computer or work station. This program can be distributed over a network, such as the Internet. Also, this program can be recorded on a computer-readable recording medium, such as a hard disk, a flexible disk (FD), a Compact-Disk Read-Only Memory (CD-ROM), a magneto-optical (MO) disk, or a Digital Versatile Disk (DVD), and can be read by the computer from the recording medium for execution.

According to an embodiment of the invention, the environment regarding the terminal of the user is evaluated at a place away from the service provider to calculate an evaluation value, and the service provided from the terminal of the service provider to the terminal of the user is controlled based on the evaluation value. Therefore, for example, the service can be provided only to the terminal not having low evaluation values (for example, an invulnerable terminal, a terminal not with a low performance, etc.). Therefore, the service can be controlled without the service provider obtaining the environment information regarding the terminal of the user.

Also, according to an embodiment of the present invention, the environment regarding the terminal of the user is evaluated from a plurality of viewpoints to calculate an evaluation value for each of viewpoints and a total evaluation value, and the service is controlled based on an evaluation value for each of the viewpoints and a total evaluation value. Therefore, for example, an evaluation value not only in view of security (vulnerability) but also an evaluation value in view of performance is calculated. Also, an evaluation value in view of total security can be calculated. Furthermore, the service can be controlled based on either one or plurality of these evaluation values (the security evaluation value, the performance evaluation value, and the total evaluation value). In this manner, various service controls can be achieved according to the characteristic of the service.

Furthermore, according to an embodiment of the present invention, the service is controlled based on a period for providing the service and an attribute of the user, in addition to the evaluation value calculated by evaluating the environment regarding the terminal of the user. Therefore, for example, the condition of the evaluation value required for service provision may be changed to be decreased only during a campaign period or only for the special-member users. With this, various service controls not necessarily restricted by the environment information of the user terminal can be achieved.

Still further, according to an embodiment of the present invention, the evaluation value is calculated at a terminal of a third-party organization other than a network provider. Therefore, objectivity can be ensured in a manner such that the evaluation value is calculated by a public third-party organization not related to the service provider or the network provider.

Still further, according to an embodiment of the present invention, the terminal of the network provider accepts the service request and the environment information from the terminal of the user, transmits the environment information to the terminal of the third-party organization for requesting calculation of an evaluation value, and then transmits the evaluation value received from the terminal of the third-party organization to the terminal of the service provider together with the service request. Therefore, direct access from the terminal of the user to the terminal of the service provider can be reduced, thereby distributing a load on the terminal of the service provider.

Still further, according to an embodiment of the present invention, when accepting the service request from the terminal of the user, the terminal of the network provider accepts service identification information for specifying the service (for example, a content number or the like) instead of a requested service detail (for example, the title of the content or the like). Therefore, it is possible to construct a framework in which the user preference (requested service detail) cannot be known by the network provider.

Still further, according to an embodiment of the present invention, when requesting the terminal of the third-party organization for calculation of an evaluation value, the terminal of the network provider transmits service request identification information that uniquely identifies the service request to the terminal of the third-party organization instead of identification information of the user issuing the service request. Therefore, it is possible to construct a framework in which user information (user ID, user name, and others) cannot be known by the third-party organization.

Still further, according to an embodiment of the present invention, when requesting the terminal of the third-party organization for calculation of an evaluation value, the terminal of the network provider accepts either one or both of hashed environment information and encrypted environment information from the terminal of the user, and then the hashed or encrypted environment information is transmitted to the terminal of the third-party organization. Therefore, it is possible to construct a framework in which the environment information itself cannot be known by the network provider. Also, in particular, by using the hashed environment information, the amount of information can be significantly reduced to also reduce communication traffic.

Still further, according to an embodiment of the present invention, the terminal of the network provider receives the encrypted evaluation value from the terminal of the third-party organization for transmission to the terminal of the service provider. Therefore, it is possible to construct a framework in which the evaluation value of the environment regarding the terminal of the user is not known to the network provider.

Still further, according to an embodiment of the present invention, a unit of accepting a registration of information regarding a terminal for use by the user is provided, it is determined whether the registration of the information regarding the terminal is accepted, and the evaluation value is calculated based on the determination result. Therefore, when there is a concern about security of the terminal because information regarding the terminal is not registered in advance, the evaluation value is decreased, for example, thereby achieving service control in consideration of security.

Still further, according to an embodiment of the present invention, a terminal of a first third-party organization evaluates the environment regarding the terminal of the user, and the registration accepting unit that accepts a registration of the information regarding a terminal for use by the user is provided to a terminal of a second third-party organization connected through a network to the terminal of the first third-party organization. The terminal of the first third-party organization obtains registration information regarding the terminal of the user through the network from the terminal of the second third-party organization, determines, based on the registration information, whether the terminal of the second third-party organization accepts the registration of the information regarding the terminal of the user, and calculates the evaluation value based on the determination result. Therefore, registration of the information and calculation of evaluation values regarding the terminal are performed in a distributed manner at different terminals. Thus, the load on each terminal regarding service control can be reduced, thereby also efficiently performing service control.

Still further, according to an embodiment of the present invention, when a service request is accepted from the terminal of the user, the terminal of the first third-party organization obtains the registration information regarding the terminal of the user from the terminal of the second third-party organization. Therefore, by obtaining the registration information from the terminal of the second third-party organization as required, the terminal of the first third-party organization does not have to hold the registration information regarding the terminal in advance, thereby reducing the storage capacity required for the storage unit of the terminal of the first third-party organization.

Still further, according to an embodiment of the present invention, a unit that sets an evaluation reference for calculating an evaluation value is further included in the terminal of the first third-party organization, and the environment regarding the terminal of the user is evaluated based on the evaluation reference set by that unit to calculate the evaluation value. Therefore, a determination of a service to be provided to the terminal of the user can be made appropriately. Furthermore, a terminal providing a service can also be restricted.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal of an environment management station that calculates an evaluation value of a terminal of a service user in view of security, the evaluation value being used to determine whether to provide a service from a terminal of a service provider to the terminal of the service user through a terminal of a network provider, the terminal of the environment management station being set in a third-party organization other than the service provider, the service user or the network provider, the terminal of the environment management station comprising:

a memory including an evaluation value storing logic that stores environment information away from the terminal of the service provider to identify software that can be installed in the terminal of the service user, hardware that can be incorporated in the terminal of the service user or hardware that can be connected to the terminal of the service user, and the evaluation value of the terminal of the service user in view of security based on vulnerability and capability of hardware and software in association with each other, the evaluation value storing logic updating the evaluation value associated with the environment information when new information about the environment information in view of security is obtained; and a hardware processor coupled to the memory, wherein the processor executes a process comprising:

receiving the environment information of the terminal of the service user from the terminal of the service user through the terminal of the network provider;

registering a registration information about the terminal of the service user;

determining whether the registering accepts the registration of the information about the terminal of the service user;

calculating the evaluation value of the terminal of the service user based on the evaluation value storing logic and a result at the determining, the calculating being performed away from the terminal of the service provider; and transmitting the evaluation value calculated at the calculating to the terminal of the service provider through the terminal of the network provider.

2. The terminal of the environment management station according to claim 1, wherein the evaluation value storing logic further stores the environment information and the evaluation value of the terminal of the service user in view of performance in association with each other, and the calculating calculates the evaluation value of the terminal of the service user in view of performance.

3. The terminal of the environment management station according to claim 1, wherein the processor further executes a process comprising obtaining the registration information about the terminal of the service user through a network from another terminal being set in the environment management station at the calculating, the determining determines based on the registration information whether the registering accepts the registration of the information of the terminal of the service user, and the calculating calculates the evaluation value based on a result at the determining.

4. The terminal of the environment management station according to claim 3, wherein upon registering a service request from the terminal of the service user, the obtaining obtains the registration information about the terminal of the service user from the another terminal being set in the environment management station.

5. The terminal of the environment management station according to claim 4, wherein the processor further executes a process comprising:

setting an evaluation reference at the calculating calculates the evaluation value;

evaluating the environment information of the terminal of the service user based on the evaluation reference at the calculating calculates the evaluation value.

6. A method for processing an evaluation value of a terminal of a service user in view of security, the evaluation value being used to determine whether to provide a service from a terminal of a service provider to the terminal of the service user through a terminal of a network provider from a terminal of an environment management station, wherein the terminal of the environment management station is set in a third-party organization other than the service provider, the service user or the network provider, the method comprising:

receiving environment information of the terminal of the service user through the terminal of the network provider, the environment information identifying software that can be installed in the terminal of the service user, hardware that can be incorporated in the terminal of the service user or hardware that can be connected to the terminal of the service user;

registering a registration information about the terminal of the service user;

determining whether the registering accepts the registration of the information about the terminal of the service user;

calculating the evaluation value of the terminal of the service user based on an evaluation value storing logic that stores the environment information away from the terminal of the service provider and the evaluation value of the terminal of the service user in view of security based on vulnerability and capability of hardware and software in association with each other, the calculating calculates the evaluation value further based on a result of the determination being performed away from the terminal of the service provider the evaluation value storing logic updating the evaluation value associated with the environment information when new information about the environment information in view of security is obtained; and transmitting the evaluation value calculated by the calculating to the terminal of the service provider through the terminal of the network provider.

* * * * *